United States Patent
Hong et al.

(10) Patent No.: US 11,703,853 B2
(45) Date of Patent: Jul. 18, 2023

(54) MULTIPLE UNMANNED AERIAL VEHICLES NAVIGATION OPTIMIZATION METHOD AND MULTIPLE UNMANNED AERIAL VEHICLES SYSTEM USING THE SAME

(71) Applicant: UNIVERSITY-INDUSTRY COOPERATION GROUP OF KYUNG HEE UNIVERSITY, Gyeonggi-do (KR)

(72) Inventors: Choong Seon Hong, Gyeonggi-do (KR); Sarder Fakhrul Abedin, Gyeonggi-do (KR); Min Kyung Lee, Gyeonggi-do (KR)

(73) Assignee: UNIVERSITY-INDUSTRY COOPERATION GROUP OF KYUNG HEE UNIVERSITY

( * ) Notice: Subject to any disclaimer, the term of this patent is extended or adjusted under 35 U.S.C. 154(b) by 249 days.

(21) Appl. No.: 17/003,598

(22) Filed: Aug. 26, 2020

(65) Prior Publication Data
US 2021/0165405 A1  Jun. 3, 2021

(30) Foreign Application Priority Data

Dec. 3, 2019 (KR) .................. 10-2019-0158688
Aug. 24, 2020 (KR) .................. 10-2020-0106062

(51) Int. Cl.
*G05D 1/00* (2006.01)
*B64C 39/02* (2023.01)
(Continued)

(52) U.S. Cl.
CPC ......... *G05D 1/0027* (2013.01); *B64C 39/024* (2013.01); *G05D 1/104* (2013.01);
(Continued)

(58) Field of Classification Search
CPC ........ G05D 1/0027; G05D 1/104; G05D 1/00; B64C 39/024; B64C 2201/12;
(Continued)

(56) References Cited

U.S. PATENT DOCUMENTS

| 10,264,586 B2 * | 4/2019 | Beattie, Jr. .......... H04W 72/046 |
| 10,340,983 B2 * | 7/2019 | Liu .......................... H04B 3/21 |
| 2022/0046114 A1 * | 2/2022 | Entelis .................... H04L 69/08 |

FOREIGN PATENT DOCUMENTS

WO  WO-2018125989 A2 *  7/2018  .......... G06F 16/1824

OTHER PUBLICATIONS

Abd-Elmagid, et al., "Average peak age-of-information minimization in UAV-assisted IoT networks," IEEE Transactions on Vehicular Technology, vol. 68, No. 2, Feb. 2019, pp. 2003-2008.
(Continued)

*Primary Examiner* — Yonel Beaulieu
(74) *Attorney, Agent, or Firm* — Adsero IP

(57) ABSTRACT

According to a technical aspect of the invention, there is provided a multiple unmanned aerial vehicles navigation optimization method is performed at a ground base station which operates in conjunction with unmanned aerial vehicles-base stations which are driven by a battery to move and cover a given trajectory point set, the multiple unmanned aerial vehicles navigation optimization method including: calculating an age-of-information metric by receiving an information update from the unmanned aerial vehicles-base stations through communication, when the ground base station is present within a transmission range of the unmanned aerial vehicles-base stations; setting conditions of a trajectory, energy efficiency, and age of information of each of the unmanned aerial vehicles-base stations; and executing Q-learning for finding a trajectory path policy of each of the unmanned aerial vehicles-base stations, so as to maximize total energy efficiency of an unmanned aerial
(Continued)

vehicles-base station relay network to which the energy efficiency and the age of information are applied.

According to the invention, the following effects are obtained. Age of information (AoI) that is a new matrix used to measure up-do-dateness of data is set, an edge computing environment for a remote cloud environment is provided by using the AoI, and a computing-oriented communications application can be executed by using the edge computing environment.

20 Claims, 14 Drawing Sheets

(51) Int. Cl.
    *G08G 5/00*     (2006.01)
    *G05D 1/10*     (2006.01)
    *B64U 101/00*     (2023.01)

(52) U.S. Cl.
    CPC ......... *G08G 5/003* (2013.01); *B64U 2101/00* (2023.01); *B64U 2201/20* (2023.01)

(58) Field of Classification Search
    CPC .. B64C 2201/146; B64C 39/02; G08G 5/003; G08G 5/0013; G08G 5/0026; G08G 5/0034; G08G 5/0039; G08G 5/0043; G08G 5/006; G08G 5/0069; G08G 5/00
    See application file for complete search history.

(56) References Cited

OTHER PUBLICATIONS

Kim, "A Study of Unmanned Aerial Vehicle Path Planning using Reinforcement Learning," Journal of the Semiconductor & Display Technology, vol. 17, No. 1. Mar. 2018, pp. 88-92.

Kalantari, et al., "On the number and 3D Placement of Drone Base Stations in Wireless Cellular Networks," presented at 2016 IEEE 84th Vehicular Technology Conference (VTC-Fall), Sep. 2016, pp. 1-6.

Korean Office Action dated Aug. 30, 2021, with English translation, 12 pages.

Abedin et al., "Resource Allocation for Ultra-Reliable and Enhanced Mobile Broadband IoT Applications in Fog Network", IEEE Transactions on Communications, vol. 67, No. 1, Jan. 2019.

\* cited by examiner

| | Algorithm 1: Training DQN with experience replay for UAV-BS Trajectory Policy Optimization in Navigation |
|---|---|
| 1 | Step 1: Initialization |
| 2 | Initialize $Q(s, a; \theta)$, $\mathcal{M}$, target DQN parameters $\theta^-$ and construct DQN |
| 3 | Step 2: Training DQN with experience replay |
| 4 | for $e = 1, \cdots, E$ do |
| 5 |     Initialize $\mathcal{S}$ |
| 6 |     for $t = 1, \cdots, T$ do |
| 7 |         Calculate the energy efficiency metric of the UAV-BSs using (11) |
| 8 |         Select action $a_t$ with given probability $\epsilon$ and calculate instant reward $R_t(a_t)$ using (19) |
| 9 |         Observe instant reward $R_t(a_t)$ and next state $s_{t'}$ |
| 10 |         Store experience $(s_t, s_{t'}, a_t, R_t(a_t))$ in the experience replay memory $\mathcal{M}$ |
| 11 |         Randomly sample minibatch of experiences from $\mathcal{M}$ |
| 12 |         Adopt stochastic gradient descent (SGD) to train the DQN using loss function in (24) |
| 13 |         Update $\theta$, $\theta^-$, $Q(s, a; \theta)$, and $Q^{\pi^{opt}}(s, a; \theta^-)$ |
| 14 | Store the Q-network |

FIG. 6

---
Algorithm 2: Testing DQN with experience replay for UAV-BS Trajectory Policy Optimization in Navigation
---
1  Load the stored Q-network of Alg. 1
2  for $t = 1, \cdots, T$ do
3      Retrieve $R_t$ of the UAV-BSs at time slot $t$
4      Retrieve and select joint UAV-BS action
        $a_t = \arg\max_a Q^{\pi^{tra}}(s_t, a; \theta)$
5      Update trajectory of UAV-BSs based on joint action index and target values of DQN
---

FIG. 7

| Simulation Parameters | Values |
|---|---|
| No. of UAV-BS | 3 |
| No. of MEC-BS | 1 |
| No. of IoT devices | 100 |
| No. of Trajectory points | [6, 14] |
| Max UAV-BS heights | [140, 250] (m) |
| Maximum UAV-BS velocity and acceleration | 100 m/s and , 5 m/s$^2$ |
| Radius of UAV-BS | 300 (m) |
| $f_c^{mmWave}$ | 28 GHz [36] |
| $B_{k,u}^{mmWave}$ | 20 × 100 MHz [36] |
| $f_c, B_u$ | 2 GHz, 20 MHz [36] |
| $P_{k,u}^c, \sigma^2, \gamma_{th}$ | 20 dBm [36], −100 dBm, 5 dB |
| For urban scenario, $a, \hat{a}, c, \hat{c}, k_1, k_2$ | 9.61, 0.16, 1, 20, 9.26 × $10^{-4}$, 2250 [36] [38] |
| Normalized AoI threshold $\Delta_k^{th}$, $\alpha_k$ | [0.3, 0.9], 1 |

FIG. 9

TABLE II: Effects of different discount factors over the average energy efficiency (EE) of the proposed and the baseline DQN approaches.

| Discount factor $\gamma$ | DQN with replay memory (Average EE) | Baseline DQN (Average EE) |
|---|---|---|
| 0.4 | 0.483663 | 0.487285 |
| 0.5 | 0.492033 | 0.486141 |
| 0.6 | 0.489998 | 0.480957 |
| 0.7 | 0.4927502 | 0.489459 |
| 0.8 | 0.490233 | 0.486083 |
| 0.9 | 0.486811 | 0.484898 |

TABLE III: Trade-off analysis between normalized average reward and normalized average AoI for different AoI thresholds.

| AoI threshold $\Delta_b^{th}$ | Normalized average reward (Proposed) | Normalized average AoI (Proposed) |
|---|---|---|
| 0.3 | 0.011284 | 0.449802 |
| 0.5 | 0.116763 | 0.420419 |
| 0.7 | 0.226587 | 0.385290 |
| 0.9 | 1.0 | 1.0 |

MULTIPLE UNMANNED AERIAL VEHICLES NAVIGATION OPTIMIZATION METHOD AND MULTIPLE UNMANNED AERIAL VEHICLES SYSTEM USING THE SAME

BACKGROUND OF THE INVENTION

Field of the Invention

The present invention relates to a multiple unmanned aerial vehicles navigation optimization method and an unmanned aerial networks system using the multiple unmanned aerial vehicles navigation optimization method.

Description of the Related Art

The rapid development of a higher-generation communications network such as the fifth-generation communications network demands unparalleled high standards of high-quality wireless connection and service.

For example, the wireless network is faced with a challenge of meeting strict requirements for different 5G application types of enhanced mobile broadband communications application, ultra-reliable and low-latency communications application, large-scale mechanical communications application, or the like.

These strict requirements are difficult for an existing network infrastructure, that is, an existing base station infrastructure, to achieve and exceed limits thereof. Hence, in order to complement the existing wireless network infrastructure, a network infrastructure that enables an unmanned aerial vehicle to serve as an aerial base station has been developed.

When the unmanned aerial vehicle serves as the aerial base station for network applications and users, the unmanned aerial vehicle can meet strict requirements of large capacity in that the unmanned aerial vehicle moves more quickly, has broader coverage, and has less delay constraints than the existing stationary wireless network infrastructure does.

However, the unmanned aerial vehicle has a limit in capacity of energy for moving and performing a function as a base station, and thus it is still difficult to build a base station and perform an autonomous search using a plurality of unmanned aerial vehicles on wireless networks.

CITATION LIST

Non-Patent Literature

Non-Patent Literature 0001: "Resource allocation for ultra-reliable and enhanced mobile broadband iot applications in fog network," by S. F. Abedin, M. G. R. Alam, S. A. Kazmi, N. H. Tran, D. Niyato, and C. S. Hong, in IEEE Transactions on Communications, vol. 67, no. 1, pp. 489-502, 2018.

SUMMARY OF THE INVENTION

A technical aspect of the invention is made to solve a problem of the related art described above, and an object thereof is to provide a multiple unmanned aerial vehicles navigation optimization method and an unmanned aerial networks system using the multiple unmanned aerial vehicles navigation optimization method for setting age of information (AoI) that is new metrics used to measure up-do-dateness of data, providing an edge computing environment for a remote cloud environment by using the AoI, and enabling to use a computing-oriented communications application by using the edge computing environment.

In addition, an object of another technical aspect of the invention is to provide a multiple unmanned aerial vehicles navigation optimization method and an unmanned aerial networks system using the multiple unmanned aerial vehicles navigation optimization method for providing multiple unmanned aerial vehicles navigation with high energy efficiency under a restriction for each situation by employing a deep Q-network, for a problem of multiple unmanned aerial vehicles navigation which ensures energy efficiency on an edge computing network.

The objects and various advantages of the invention will be more clearly understood by those skilled in the art, from preferred examples of the invention.

According to a technical aspect of the invention, there is proposed a multiple unmanned aerial vehicles navigation optimization method. The multiple unmanned aerial vehicles navigation optimization method is performed at a ground base station which operates in conjunction with unmanned aerial vehicles-base stations which are driven by a battery to move and cover a given trajectory point set, the multiple unmanned aerial vehicles navigation optimization method including: calculating an age-of-information metric by receiving an information update from the unmanned aerial vehicles-base stations through communication, when the ground base station is present within a transmission range of the unmanned aerial vehicles-base stations; setting conditions of a trajectory, energy efficiency, and age of information of each of the unmanned aerial vehicles-base stations; and executing Q-learning for finding a trajectory path policy of each of the unmanned aerial vehicles-base stations, so as to maximize total energy efficiency of an unmanned aerial vehicles-base station relay network to which the energy efficiency and the age of information are applied.

According to an example, the multiple unmanned aerial vehicles navigation optimization method may further include, before the calculating of the age-of-information metric, calculating receiving electric power supplied from the unmanned aerial vehicles-base stations, generating a back-haul link by calculating back-haul capacity between the unmanned aerial vehicles-base stations and the ground base station by using the receiving electric power, and calculating transmission energy of the unmanned aerial vehicles-base stations while the back-haul link is used at a time t.

According to the example, the receiving electric power may be calculated in accordance with the following $$\hat{P}_{b,u} = P_{b,u}^{tx} \cdot G_u^{tx} \cdot G_b^{rx} \left( \frac{c}{4\pi \delta_{b,u} f_c^{mmWave}} \right)$$

here, $P_{b,u}^{tx}$ representing transmitting electric power from an unmanned aerial vehicles-base station (UAV-BS) u to a ground base station (BS) b, $\delta_{b,u}$ representing a distance between the unmanned aerial vehicles-base station (UAV-BS) u and the ground base station (BS) b, c representing speed of light, $f_c^{mmWave}$ representing a carrier frequency of mmWave back-haul link, and $G_u^{tx}$ and $G_b^{rx}$ representing antenna gains of the transmitter UAV-BS u and the receiver BS b, respectively.

According to the example, the back-haul capacity may be calculated in accordance with the following expression.

$$r_{b,u}^{mmWave}(t) = \begin{cases} \beta_{b,u}^{mmWave} \cdot \log\left(1 + \dfrac{\hat{P}_{b,u}}{\beta_{b,u}^{mmWave}\sigma^2}\right), & \text{if } \delta_{u,b} \leq \bar{\alpha}, \\ 0, & \text{otherwise} \end{cases}$$

here, $\beta_{b,u}^{mmWave}$ representing an mmWave back-haul bandwidth, and $\sigma^2$ representing added noise.

According to the example, the setting of conditions of a trajectory, energy efficiency, and age of information of each of the unmanned aerial vehicles-base stations may include: setting each of the unmanned aerial vehicles-base stations to cover only a subset of a trajectory point at a given timeslot; and setting a subset for each of the unmanned aerial vehicles-base stations to satisfy a limitation condition, the unmanned aerial vehicles-base stations configured of the trajectory point.

According to the example, the setting of the conditions of the trajectory, the energy efficiency, and the age of information of each of the unmanned aerial vehicles-base stations may further include: setting a non-overlapped trajectory of an unmanned aerial vehicles-base station, as a trajectory condition of the unmanned aerial vehicles-base station, except for a trajectory point of the ground base station at which an information update occurs; forming a joint trajectory of the unmanned aerial vehicles-base stations in which trajectory points are all interdependently included; securing total energy efficiency of the unmanned aerial vehicles-base stations such that communicating and moving energy is larger than a minimum energy efficiency threshold; and securing satisfaction of a condition that average up-to-dateness of an information update is lower than an age-of-information threshold.

According to the example, the ground base station may set a four-dimensional state space for a trajectory policy of the unmanned aerial vehicles-base stations, and an action space by setting navigation to the next state in one executable state, while each of the unmanned aerial vehicles-base stations meets trajectory and communication constraints, and the executing of the Q-learning for finding the trajectory path policy may include setting a reward based on collision of a waypoint to a plurality of action spaces set by a plurality of unmanned aerial vehicles-base stations, respectively, in any state.

According to the example, the setting of the reward based on the collision of the waypoint may include: decreasing a size of a state space used to extract a characteristic for each situation, the characteristic being used for unmanned aerial vehicles-base station navigation; storing a state change which is observed by an unmanned aerial vehicles-base station agent; and executing Q-learning for finding a trajectory path policy of the unmanned aerial vehicles-base stations, so as to maximize total energy efficiency of an unmanned aerial vehicles-base station relay network to which indexes of energy and the age of information are applied.

According to the example, the executing of the Q-learning may include defining a future reward using the following expression, here, $\gamma \in [0, 1]$ being satisfied.

$$\hat{R}(s, a; t) = \sum_{t_0=0}^{T} \gamma \times R_{t-t_0}(a_t),$$

According to another technical aspect of the invention, there is proposed a multiple unmanned aerial networks system. The unmanned aerial networks system includes an IoT (Internet of Things) device set including IoT devices which are randomly located at different trajectory points included in the given trajectory point set; an unmanned aerial vehicle set including a plurality of unmanned aerial vehicles-base stations which are driven by a battery to move and cover the given trajectory point set and perform a relay function of the IoT device set; and a ground base station that receives an information update from the IoT devices through a relay by the unmanned aerial vehicle set and supports a computation-oriented communications application.

According to another example, the unmanned aerial vehicles-base stations may pass through different trajectory points included in the trajectory point set over a finite time and collect an information data packet from an activated IoT device located around any trajectory point by using an uplink communication channel.

According to the other example, the unmanned aerial vehicles-base stations may generate a back-haul communication link to a ground base station and transmit the information data packet collected via the generated back-haul communication link to the ground base station, when the ground base station is present within a transmission range of the unmanned aerial vehicles-base stations.

According to the other example, the ground base station may include a multi-access edge computing server, and the multi-access edge computing server may perform an information update with respect to different trajectory points by using the information data packet transmitted from the unmanned aerial vehicles-base stations and calculates an age-of-information metric.

According to the other example, an air-to-ground path loss probability between the activated IoT device and the unmanned aerial vehicles-base stations may be defined by the following expression, $$\zeta_{i,p}^u = \begin{cases} \dfrac{1}{1 + \alpha\exp\left(-\hat{\alpha}\left(\dfrac{180}{\pi}\Theta_u - \alpha\right)\right)}, & Los \text{ channel,} \\ 1 - \left[\dfrac{1}{1 + \alpha\exp\left(-\hat{\alpha}\left(\dfrac{180}{\pi}\Theta_u - \alpha\right)\right)}\right], & NLos \text{ channel} \end{cases}$$

here, $\alpha$ and $\hat{\alpha}$ representing environment-dependent constants for an LoS channel and an NLoS channel, respectively, and $\Theta_u$ representing an elevation angle of each of the unmanned aerial vehicles-base stations.

According to the other example, total energy efficiency of the unmanned aerial vehicles-base stations which cover a trajectory point P to provide service to IoT devices depending on an elapsed time T may be defined by the following expression, $$|\eta(\mathcal{P}, u) = \sum_{t=1}^{T}\sum_{p=1}^{|\mathcal{P}|} \dfrac{\left(r_{b,u}^{mmWave}(t) + \sum_{i=1}^{|\mathcal{I}|} r_{i,p}^u(t)\right)}{\left(E_u^{mmWave}(t) + E_u(t)\right)}.$$

here, $r_{b,u}^{mmWave}(t)$ representing back-haul capacity of a channel between each of the unmanned aerial vehicles-base stations and the ground base station at a time t, and $E_u^{mmWave}(t)$ representing transmission energy of the unmanned aerial vehicles-base stations while a back-haul link is used at the time t.

According to the other example, the ground base station may calculate age of information of a trajectory p at the time t by using the following expression, $$\Delta_u(\mathcal{P}, t) = t - \Delta'_u(p, t), \forall\, p \in \mathcal{P}.$$

here, $\Delta_u'(p, t)$ representing a time stamp of a latest data packet received by the ground base station, when the unmanned aerial vehicles-base stations are located at a trajectory point p.

According to the other example, the ground base station may set a four-dimensional state space for a trajectory policy of the unmanned aerial vehicles-base stations, and an action space by setting navigation to the next state in one executable state, while each of the unmanned aerial vehicles-base stations meets trajectory and communication constraints, and the ground base station may set a reward based on collision of a waypoint to a plurality of action spaces set by a plurality of unmanned aerial vehicles-base stations, respectively, in any state.

According to the other example, the ground base station may generate a deep Q-learning model, and the deep Q-learning model may include: a deep-neural network that decreases a size of a state space used to extract a characteristic for each situation, the characteristic being used for unmanned aerial vehicles-base station navigation; an experience replay memory that stores a state change which is observed by an unmanned aerial vehicles-base station agent; and a Q-learning framework that executes Q-learning for finding a trajectory path policy of the unmanned aerial vehicles-base stations, so as to maximize total energy efficiency of an unmanned aerial vehicles-base station relay network to which indexes of energy and the age of information are applied.

Means to solve problems do not mean a complete list of characteristics of the invention. Various means of the invention to solve the problems can be more specifically understood with reference to specific embodiments in detailed description to be provided below.

Effects

According to an embodiment of the invention, the following effects are obtained. Age of information (AoI) that is a new matrix used to measure up-do-dateness of data is set, an edge computing environment for a remote cloud environment is provided by using the AoI, and a computing-oriented communications application can be executed by using the edge computing environment.

In addition, according to another embodiment of the invention, the following effects are obtained. Multiple unmanned aerial vehicles navigation with high energy efficiency under a restriction for each situation can be provided by employing a deep Q-network, for a problem of multiple unmanned aerial vehicles navigation which ensures energy efficiency on an edge computing network.

BRIEF DESCRIPTION OF THE DRAWINGS

FIG. 5 is a diagram for illustrating an experience replaying deep Q-network algorithm for optimizing a UAV-BS trajectory policy according to the example of the invention;

FIG. 6 is a diagram for illustrating an algorithm for a DQN test through an experience replay for optimizing the UAV-BS trajectory policy according to the example of the invention;

FIG. 7 is a diagram illustrating a setting for a simulation according to the example of the invention;

FIG. 9 is a table illustrating examples of a discount factor and an age-of-information (AoI) threshold which are applied to the simulation;

DETAILED DESCRIPTION OF THE PREFERRED EMBODIMENTS

Figure 1:
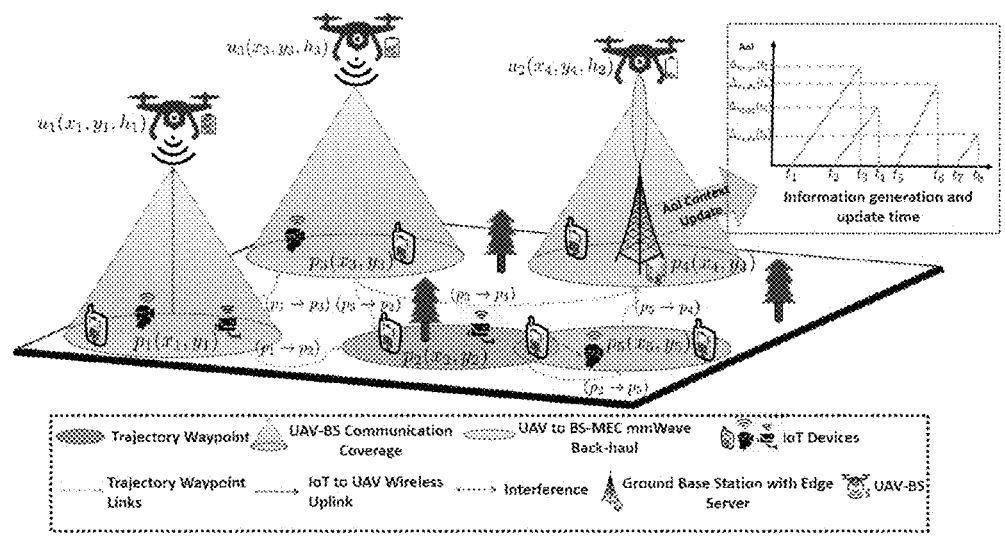
FIG. 1 is a diagram for providing the conceptual description of an unmanned aerial networks system to which a multiple unmanned aerial vehicles navigation optimization method according to an example of the invention is applied.

Hereinafter, preferred embodiments of the invention will be described with reference to the accompanying drawings.

However, embodiments of the invention can be modified into various different embodiments, and the scope of the invention is not limited to the embodiments to be described below. In addition, the embodiments of the invention are provided to more completely describe the invention to a person of ordinary knowledge in the technical field.

In other words, the objects, features, and advantages described above will be described below in detail with reference to the accompanying drawings, and thus those who have ordinary knowledge in the technical field to which the invention belongs can easily embody a technical idea of the invention. In the description of the invention, when detailed description of a known technology related to the invention is deemed to result in blurring the gist of the invention unnecessarily, the detailed description thereof will be omitted. Hereinafter, preferred examples according to the invention will be described in detail with reference to the accompanying drawings. The same reference signs in the drawings are assigned to the same or similar configurational elements.

In addition, a word having a singular form also has a meaning of the word having a plural form, unless obviously implied otherwise in context. In this application, terms such as "to configure" or "to comprise" are not to be understood to necessarily include all of various configurational elements described in this specification or all of various steps, but to be understood to omit some configurational elements or some steps thereof or to further include additional configurational elements or steps.

In addition, in order to describe a system according to the invention, various configurational elements and sub-configurational elements thereof will be described in the following description. These configurational elements and the sub-configurational elements thereof can be realized as various types of hardware, software, or a combination thereof. For example, each element can be realized as an electronic configuration for performing a corresponding function or can be realized as software that can be driven in an electronic system or one functional element of the software. Alternatively, the element can be realized as the electronic configuration and driving software corresponding thereto.

Various techniques to be described in this specification can be realized with hardware or software or can be realized with a combination of both the hardware and software in an appropriate case. Terms such as "unit", "server", and "system" as used in this specification can be similarly used as an equivalent to a computer-related "entity", that is, hardware, a combination of hardware and software, software or software during execution. In addition, each function executed in the system of the invention can be configured in a module unit, can be recorded in one physical memory, or can be recorded by being distributed between two or more memories and recording media.

Various flowcharts are disclosed to describe the embodiments of the invention; however, the flowcharts are provided for convenience of the description of each step, and thus it is not necessary to perform every step in accordance with the flowcharts. In other words, every step in the flowchart can be performed simultaneously, in an order described in the flowcharts, or in a reverse order of the order described in the flowcharts.

This application provides the description of a navigation technology for multiple unmanned aerial vehicles (UAV) in which a mobile base station (BS) is disposed in order to improve up-to-dateness of data and connection with internet of things (IoT) device. The navigation technology will be described including the following features.

First, an aim is to optimize energy efficiency by optimizing a multiple unmanned aerial vehicles-base station (UAV-BS) trajectory policy, and an energy-efficient trajectory optimization problem of multiple unmanned aerial vehicles-base station (UAV-BS) is formulated.

In addition, up-to-dateness of data is secured in a ground base station (BS) by combining different context information such as restrictions of energy and age of information (AoI).

Secondly, deep reinforcement learning using an experience replay model is started to solve a formulated problem related to situational restrictions of multiple unmanned aerial vehicles-base station (UAV-BS). In other words, navigation with high energy efficiency under a restriction for each situation by employing a deep Q-Network which is a deep reinforcement learning technique will be described.

A proposed training model enables an effective real-time trajectory policy to be obtained with respect to the multiple unmanned aerial vehicles-base station (UAV-BS) and enables an observable network state to be captured, as time elapses. As a result, a state, observation, an action space, and a reward for the deep Q-network proposed through an experience replay by which it is possible to effectively solve the trajectory optimization problem under constraints of age of information (AoI) and energy efficiency are clearly designed. In addition, unlike a deep Q-network in the related art, the proposed deep Q-network model acquires an optimal trajectory policy, while adjusting locations of a plurality of multiple unmanned aerial vehicles-base station (UAV-BS) by using advantages of an experience replay memory.

Application of the proposed training model enables the effective real-time trajectory policy with respect to the multiple unmanned aerial vehicles-base station (UAV-BS) to capture the observable network state, as time elapses.

Lastly, the description that the proposed approach method in this application is more energy-efficient than an existing approach method is. In this respect, results of extensive experimental analysis are described in order to evaluate an outcome of a technical feature described in detail. In addition, results of extensive simulation analysis are described in order to find an appropriate system parameter to support a learning model with an appropriate discount rate and a threshold of AoI performance metrics. Based on the results, the description that a navigation technology proposed in this application achieves considerable energy efficiency and up-to-dateness of data, compared to the approach method in the related art.

In addition, in the invention, unmanned aerial vehicle navigation is described focusing on a calculation-oriented communication (COC) application with consideration for both metrics of the energy efficiency and the age of information (AoI).

In addition, in the invention, regarding energy efficiency, unlike the related art, setting of a trajectory of the unmanned aerial vehicles-base station (UAV-BS) is described, the trajectory being set with consideration for a trade-off between metrics of energy efficiency and age of information (AoI) and another trajectory restriction point of the calculation-oriented communication (COC) application. In addition, a joint action space is set with consideration for multiple unmanned aerial vehicles-base station (UAV-BS) navigation which further decreases overlapped coverage in order to increase energy efficiency of the unmanned aerial vehicles-base station (UAV-BS).

In addition, in the invention, regarding the age of information (AoI), in order to integrate new information updates of the unmanned aerial vehicles-base stations (UAV-BS) for the calculation-oriented communication (COC), a high-frequency millimeter wave (mmWave) wireless spectrum is set to perform back-haul communication between the unmanned aerial vehicles-base station (UAV-BS) and the ground base station.

<System Model>

FIG. 1 is a diagram for providing the conceptual description of an unmanned aerial networks system to which the multiple unmanned aerial vehicles navigation optimization method according to the example of the invention is applied.

FIG. 1 illustrates the unmanned aerial networks system model using edge computing.

The unmanned aerial networks system includes at least one ground base station and at least one unmanned aerial vehicles-base station (UAV-BS). In addition, a given trajectory point set P={1, 2, 3, ..., p, ..., P} is taken into account.

Trajectory points of P are covered by an unmanned aerial vehicles-base station (UAV-BS) set ц={1, 2, 3, ..., u, ..., U} which is driven by a battery. Here, the unmanned aerial vehicles-base station (UAV-BS) set fulfills a relay function of internet of things (IoT) device I={1, 2, 3, ..., i, ..., I} which is a user terminal.

In this application, a fact that the IoT device set is considered to be located randomly at different trajectory points. In addition, in this application, a ground base station (BS-MEC) b which includes a multi-access edge computing server (MEC) and fulfills a function of an information fusion center which supports the calculation-oriented communication application by receiving an information update from the IoT device via a relay by the unmanned aerial vehicles-base station (UAV-BS).

Figure 2:
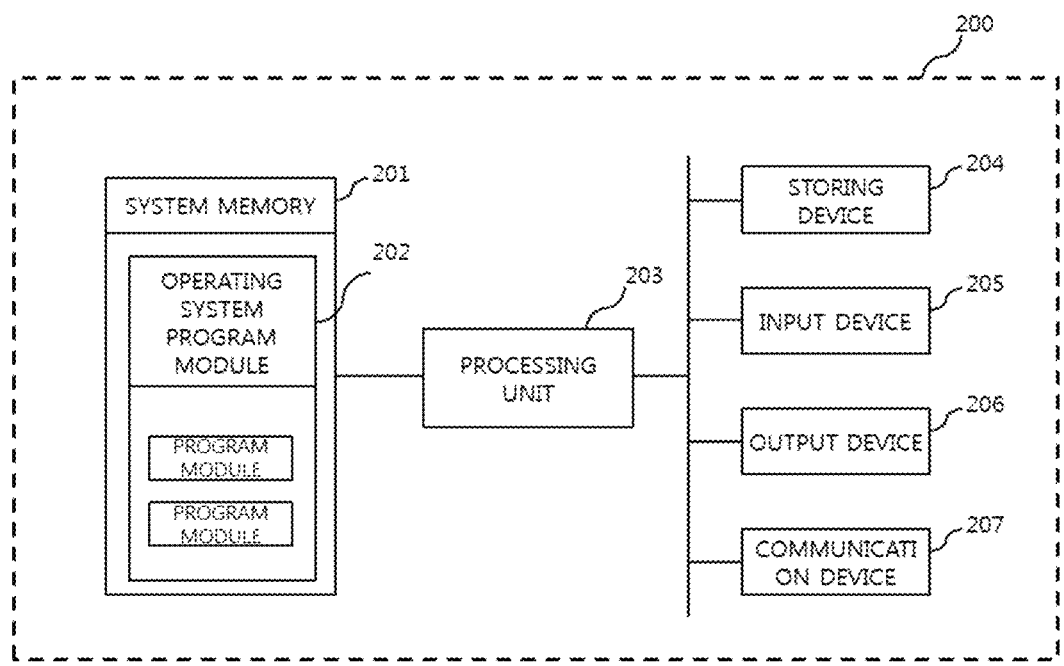
FIG. 2 is a diagram illustrating an example of a computing device which realizes a multi-access edge computing server.

FIG. 2 is a diagram illustrating an example of a computing device which realizes the multi-access edge computing server. With reference to FIG. 2, the multi-access edge computing server (MEC) is realized by a computing device 200 and can include at least a processing unit 203 and a system memory 201, as any computing device that executes an application which fulfills a function to be described below in accordance with a logic scenario in a database program. The computing device can include a plurality of processing unit which cooperate when a program is executed. Depending on an accurate configuration and type of computing device, the system memory 201 can be a volatile memory (for example, RAM), a non-volatile memory (for example, ROM, flash memory, or the like), or a combination thereof. The system memory 201 includes an appropriate operating system 202 which controls an operation of a platform. For example, the operating system can be similar to a WINDOWS operating system produced by Microsoft corporation. The system memory 201 can include a program module and at least one software application such as an application.

The computing device can have an additional feature or function. For example, the computing device can include an additional data storing device 204 such as a magnetic disk, an optical disk, or a tape. The additional storage can be a mobile storage and/or a stationary storage. A computer-readable storage medium can include a volatile and non-volatile and mobile and stationary medium that is realized by any method or technique for storage information such as computer-readable instructions, a data structure, a program module, or other data. Both the system memory 201 and the storage 204 are described only as an example of the computer-readable storage medium. Examples of the computer-readable storage medium can include a RAM, a ROM, an EEPROM, a flash memory or other memory techniques, a CD-ROM, a DVD or other optical storage, a magnetic tape, a magnetic disk storage or other magnetic storage device, or any other mediums which can store desired information and be accessed by the computing device 200.

Examples of an input device 205 of the computing device can include a keyboard, a mouse, a pen, a voice input device, a touch input device, and a comparison performable input device. Examples of an output device 206 can include a display, a speaker, a printer, and other types of output devices. The devices are widely known in this technical field, and thus the detailed description thereof is omitted.

For example, the computing device can include a communication device 207 that allows a device to communicate with another device via a network 20 in a distribution computing environment, such as a wired and wireless network, a satellite link, a cellular link, a local area network, and a comparison performable mechanism. The communication device 207 is an example of a communication medium, and examples of the communication medium can include computer-readable instructions, a data structure, a program module, or other data.

The multi-access edge computing server (BS-MEC) can be a point of a network that can use various communication resources in order to achieve specific calculation accuracy for which a timely information update needs to be performed from various network sources.

The ground base station b including the multi-access edge computing server (BS-MEC) is regarded as a trajectory point within setting P indicated by a trajectory point set $P^b = \{p \in P: (b, p) \in F\}$ of surrounding ground base stations b except for the ground base station b. Here, $F \subseteq P \times P$ represents a set of trajectory connection between trajectory points.

An unmanned aerial vehicles-base station (UAV-BS) u passes through different trajectory points of P over a finite observation time T. As the unmanned aerial vehicles-base station (UAV-BS) moves to any trajectory point p, the unmanned aerial vehicles-base station collects an information data packet from an activated IoT device i located around the corresponding trajectory point p by using an uplink communication channel.

When the ground base station (BS-MEC) b is present within a transmission range of the unmanned aerial vehicles-base station (UAV-BS) u, the unmanned aerial vehicles-base station (UAV-BS) u uses a back-haul communication link. As a result, the multi-access edge computing server (MEC) provided in the ground base station (BS-MEC) b can receive new information update from another trajectory point and can calculate an age-of-information (AoI) metric.

Here, the ground base station (BS-MEC) is described to have a series of mmWave directional antennas and to provide an mmWave spectrum dedicated to back-haul communication with the unmanned aerial vehicles-base station (UAV-BS). In addition, each of the IoT device and the unmanned aerial vehicles-base station (UAV-BS) includes a directional antenna, and thus the IoT device can transmit an information update to the unmanned aerial vehicles-base station (UAV-BS) by using a non-mmWave spectrum.

However, the communication method is not limited thereto, and various other wireless communication methods can be applied thereto.

Figure 3:
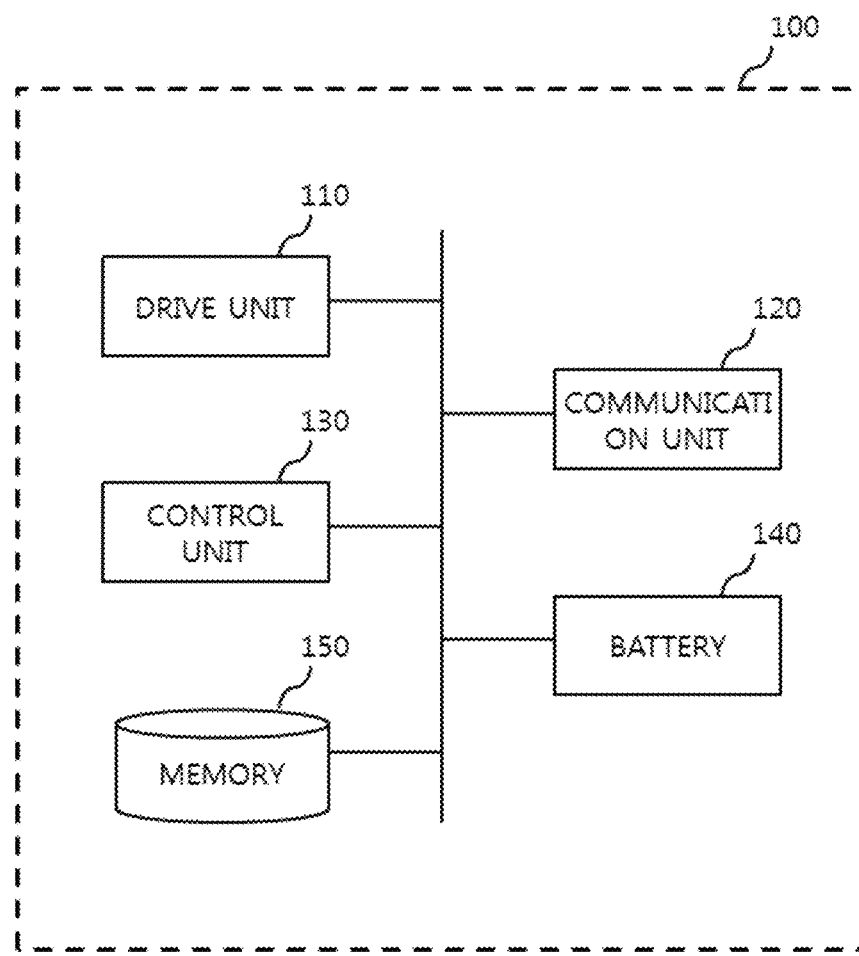
FIG. 3 is a block diagram illustrating an unmanned aerial vehicles-base station according to an example of the invention.

FIG. 3 is a block diagram illustrating an example of the unmanned aerial vehicles-base station according to the example of the invention. With reference to FIG. 3, an unmanned aerial vehicles-base station (UAV-BS) 100 can include a drive unit 110, a communication unit 120, a control unit 130, a battery 140, and a memory 150.

The drive unit 110 is a unit that moves the unmanned aerial vehicles-base station (UAV-BS) in response to control from the control unit 130, by using power stored in the battery 140. In an example where the unmanned aerial vehicles-base station (UAV-BS) is configured of drones having a plurality of propellers, the drive unit 110 can include propellers, a motor that drives the propellers, and a motor driver that controls the motor. Meanwhile, the unmanned aerial vehicles-base station (UAV-BS) can be realized to have various other configurations such as a configuration in which wings are realized as propellers (motor, jet engine, or the like).

The communication unit 120 can form a communication channel with the ground base station (BS) or the IoT device. Similarly to the example described above, the communication unit 120 can include a directional antenna, can communicate with the ground base station by using the dedicated mmWave spectrum dedicated to the back-haul communication, and can communicate with the IoT device by using the non-mmWave spectrum.

The battery 140 stores power and supplies the power to every configurational elements of the unmanned aerial vehicles-base station.

The control unit 130 can operate using the power stored in the battery and can control driving and operation of the unmanned aerial vehicles-base station by controlling the other configurational elements of the unmanned aerial vehicles-base station. The control unit performs every functional feature of the unmanned aerial vehicles-base station described above an to be described below.

The memory 150 as a data storing device can provide a reading or writing function of data to the other configurational elements of the unmanned aerial vehicles-base station.

Hereinafter, the description will be provided focusing on deployment, communication, and navigation of the unmanned aerial vehicles-base station (UAV-BS) u for a data relay from another source (for example, activated IoT device) i of the trajectory point p to the ground base station (BS-MEC) b. In addition, a default-maximum-signal-to-interference-plus-noise ratio (SINR)-based approach method is applied to user connection between the IoT device and an unmanned aerial vehicles-base stations (UAV-BS) located at different trajectory points.

A. IoT-to-UAV-BS Communication Model

An air-to-ground path loss probability between the unmanned aerial vehicles-base station (UAV-BS) u and the activated IoT device i, at the trajectory point p, is calculated from Expression 1 below.

$$\zeta_{i,p}^u = \begin{cases} \dfrac{1}{1+\alpha\exp\left(-\hat{\alpha}\left(\dfrac{180}{+z,999}\Theta_u - \alpha\right)\right)}, \\ \qquad\qquad\qquad\qquad LoS \text{ channel} \\ 1 - \left[\dfrac{1}{1+\alpha\exp\left(-\hat{\alpha}\left(\dfrac{180}{+z,999}\Theta_u - \alpha\right)\right)}\right], \\ \qquad\qquad\qquad\qquad NLoS \text{ channel.} \end{cases} \quad \text{Expression 1}$$

Here, $\alpha$ and $\hat{\alpha}$ represent environment-dependent constants for an LoS channel and an NLoS channel, respectively, and $\Theta_u$ represents an elevation angle of the unmanned aerial vehicles-base stations (UAV-BS) u.

In Expression 1, regarding a path loss probability of the LoS channel and the NLoS channel, unlike a rural environment, an uplink communication link between the unmanned aerial vehicles-base station (UAV-BS) and the activated IoT device in an urban or underground environment is obtained by reflecting characteristics of disturbance due to surrounding obstacles (for example, buildings).

A path loss with a decibel (dB) as a unit can be calculated from Expression 2.

$$P_{i,p}^u = \begin{cases} 20\log\left(\dfrac{4\pi f_c \delta_{i,p}^u}{c}\right) + \epsilon, \; LoS \text{ channel,} \\ 20\log\left(\dfrac{4\pi f_c \delta_{i,p}^u}{c}\right) + \hat{\epsilon}, \; NLoS \text{ channel.} \end{cases} \quad \text{Expression 2}$$

Here, $f_c$ represents an uplink channel frequency, and $\epsilon$ and $\hat{\epsilon}$ represent loss factors of the LoS and NLoS channels, respectively.

By using Expression 2, a signal output received by the unmanned aerial vehicles-base station (UAV-BS) u from the activated IoT device i, at the trajectory point p, is calculated from Expression 3 below.

$$\hat{P}_{i,p}^u = \dfrac{\overline{P}_{i,p}^u}{P_{i,p}^u}, \quad \text{Expression 3}$$

Here, $\hat{P}_{i,p}^u$ represents transmitting electric power of the IoT device i to offload data to the unmanned aerial vehicles-base station (UAV-BS) u.

The SINR of the unmanned aerial vehicles-base station (UAV-BS) u which is received by the IoT device i at a time t at the trajectory point p is calculated from Expression 4 below.

$$\gamma_{i,p}^u(t) = \dfrac{\hat{P}_{i,p}^u \left(10^{\frac{\zeta_{i,p}^u}{10}}\right)^{-1}}{I_{i,p}^u + \sigma^2}. \quad \text{Expression 4}$$

Here, $I_{i,p}^u$ represents reception interference of the unmanned aerial vehicles-base station (UAV-BS) u due to another unmanned aerial vehicles-base station (UAV-BS) u', and the other unmanned aerial vehicles-base station (UAV-BS) u' supplies service to an IoT device i' located at a trajectory point p' which overlaps another adjacent point. Here, $\sigma^2$ represents noise intensity. $I_{i,p}^u$ satisfies Expression 4-1 below.

$$I_{i,p}^u = \Sigma_{p'\in\mathcal{P}}\Sigma_{u'\in\mathcal{U}}\Sigma_{i'\in\mathcal{I}}\hat{P}_{i',p'}^{u'}\left(10^{\frac{\zeta_{i',p'}^{u'}}{10}}\right)^{-1} \quad \text{Expression 4-1}$$

By using Expression 4, channel capacity at the time t is defined as Expression 5 below.

$$r_{i,p}^u(t) = \begin{cases} \dfrac{\beta_u}{|\mathcal{I}|}\cdot\log(1+\gamma_{i,p}^u(t)), \text{ if } \gamma_{i,p}^u(t) > \gamma_{th}, \\ 0, \text{ otherwise.} \end{cases} \quad \text{Expression 5}$$

Here, $\beta_u$ represents a fixed non-mmWave uplink channel bandwidth and is uniformed distributed to the IoT devices at the trajectory point p. Here, $\gamma_{th}$ represents an SINR threshold for ensuring successful uplink transmission between the IoT device and the UAV-BS.

B. UAV-BS-to-BS Communication Model

Receiving electric power from the unmanned aerial vehicles-base station (UAV-BS) u to the ground base station (BS) b is calculated from Expression 6 below.

$$\hat{P}_{b,u} = P_{b,u}^{tx} \cdot G_u^{tx} \cdot G_b^{rx} \left( \frac{c}{4\pi \delta_{b,u} f_c^{mmWave}} \right).$$

Expression 6

Here, $P_{b,u}^{tx}$ represents transmitting electric power from the unmanned aerial vehicles-base station (UAV-BS) u to the ground base station (BS) b, $\delta_{b,u}$ represents a distance between the unmanned aerial vehicles-base station (UAV-BS) u and the ground base station (BS) b, c represents speed of light, $f_c^{mmWave}$ represents a carrier frequency of mmWave back-haul link, and $G_u^{tx}$ and $G_b^{rx}$ represent antenna gains of the transmitter UAV-BS u and the receiver BS b, respectively.

Back-haul capacity of a channel from the unmanned aerial vehicles-base station (UAV-BS) u to the ground base station (BS) b is calculated from Expression 7 below.

$$r_{b,u}^{mmWave}(t) = \begin{cases} \beta_{b,u}^{mmWave} \cdot \log\left(1 + \frac{\hat{P}_{b,u}}{\beta_{b,u}^{mmWave} \sigma^2}\right), \\ \quad \text{if } \delta_{u,b} \leq \overline{\alpha}, \\ 0, \text{ otherwise.} \end{cases}$$

Expression 7

Here, $\beta_{b,u}^{mmWave}$ represents an mmWave back-haul bandwidth, and $\sigma^2$ represents added noise. When the distance $\delta_{b,u}$ between the unmanned aerial vehicles-base station (UAV-BS) having an altitude $h_u$ and the ground base station (BS) b is shorter than a threshold distance $\overline{\alpha}$, the unmanned aerial vehicles-base station (UAV-BS) generates a back-haul link and transmits an information update to the ground base station (BS), by using the mmWave back-haul bandwidth, that is, $\beta_{b,u}^{mmWave}$.

Here, $\delta_{b,u}$ satisfies Expression 7-1 below.

$$\delta_{b,u} = \sqrt{h_u^2 + (x_u - x_b)^2 + (y_u - y_b)^2}$$

Expression 7-1

By using Expression 7, a transmission energy of the unmanned aerial vehicles-base station (UAV-BS) u during using the back-haul link at the time t is calculated from Expression 8 below.

$$E_u^{mmWave}(t) = P_{b,u}^{tx} \times r_{b,u}^{mmWave}(t)$$

Expression 8

C. UAV-BS Relay Network Energy Efficiency Metric Design

The unmanned aerial vehicles-base station (UAV-BS) u covers an observation region horizontally at a constancy altitude $h_u$ at which the other unmanned aerial vehicles-base stations (UAV-BS) maintain different altitudes.

In addition, a UAV-BS trajectory at the time t is defined as Expression 8-1 below.

Expression 8-1

$$\tau_u(t) = [x_u(t) \cdot y_u(t)]^T \in \mathbb{R}^{2 \times 1}$$

Expression 8-1

Hence, a temporal change distance $\hat{x}_u(t)$ and $\hat{y}_u(t)$ which is applied by the unmanned aerial vehicles-base station (UAV-BS) horizontally at a constant altitude hu from a location on a current trajectory to the next location is defined as Expression 9 below.

$$\delta_u(t) = \sqrt{h_u^2 + [x_u(t) - \hat{x}_u(t)]^2 + [y_u(t) - \hat{y}_u(t)]^2},$$

Expression 9

$\forall u \in \mathcal{U}, 0 \leq t \leq T.$

A total moving energy cost of the unmanned aerial vehicles-base station (UAV-BS) u to cover a distance $\delta_u$ at the time t is calculated from Expression 10 below.

$$E_u(t) = \delta_u(t) \times E_{prop}$$

Expression 10

Here, $E_{prop}$ represents an upper limit of a propulsion power consumption quantity, k1 and k2 represent values set depending on the unmanned aerial vehicles-base stations (UAV-BS), and g represents gravitational acceleration. $E_{prop}$ satisfies Expression 10-1 below.

$$E_{prop} = k_1 \|v\|^3 + \frac{k_2}{\|v\|} \left(1 + \frac{\|a\|^2}{g^2}\right)$$

Expression 10-1

Hence, total energy efficiency of the unmanned aerial vehicles-base station (UAV-BS) u which covers a trajectory point P to provide service to the IoT devices depending on an elapsed time T is defined as Expression 11 below.

$$|\eta(\mathcal{P}, u) = \sum_{t=1}^{T} \sum_{p=1}^{|\mathcal{P}|} \frac{\left(r_{b,u}^{mmWave}(t) + \sum_{i=1}^{|\mathcal{I}|} r_{i,p}^u(t)\right)}{\left(E_u^{mmWave}(t) + E_u(t)\right)}.$$

Expression 11

D. Age of Information Model for Ground Base Station

The age-of-information (AoI) metric is used to enable the unmanned aerial vehicles-base station (UAV-BS) to measure the up-to-dateness of information collected by the unmanned aerial vehicles-base station (UAV-BS) at the trajectory point of P which fulfills a function of a relay nod of the IoT device.

Hence, age of information (AoI) of a trajectory p at the time t in the ground base station (BS) b is calculated from Expression 12 below.

Expression 12

$$\Delta_u(\mathcal{P}, t) = t - \Delta_u'(p, t), \forall p \in \mathcal{P}.$$

Expression 12

Here, $A_u'(p, t)$ represents a time stamp of a latest data packet received by the ground base station (BS) b, when the unmanned aerial vehicles-base station (UAV-BS) u is located at a trajectory point p. The information update from the trajectory point p at the time t is assumed as the latest information update. In addition, age of information (AoI) related to a trajectory waypoint p at the time t is given from Expression 12.

While the ground base station (BS) b does not receive a new information update from the trajectory waypoint p, values of $\Delta_u(\mathcal{P}, t)$ and $\forall p \in \mathcal{P}$ increase linearly at the time t. This means that information becomes gradually older.

As soon as the ground base station (BS) b receives a new information update from the trajectory waypoint p, the corresponding time stamp is immediately updated from $\Delta_u'(p, t)$ to $\Delta_u'(p, t+1)$ and is updated to decrease values of $\Delta_u'(p, t)$ and $\forall p \in \mathcal{P}$ by $\Delta_u'(p, t+1) - \Delta_u'(p, t)$.

In other words, an information update is executed by the unmanned aerial vehicles-base station (UAV-BS) at a time point t+1 in the ground base station (BS) b, and the values of $\Delta_u(\mathcal{P}, t)$ and $\forall p \in \mathcal{P}$ corresponds to an information update delay.

when the time t is 0, $\Delta_u(\mathcal{P}, t)$ is assumed as 0, too.

Average age of information (AoI) of the trajectory point P during a timeslot T is calculated from Expression 13 below, the average age of information being calculated in the ground base station (BS) b.

$$\hat{\Delta}_b(\mathcal{P}) = \frac{1}{T|\mathcal{P}|} \sum_{t=1}^{T} \sum_{p \in \mathcal{P}} \Delta_u(p, t). \quad \text{Expression 13}$$

<Problem Formulation>

In order to first formulate a UAV-BS navigation optimization problem under the situational constraints described above, the unmanned aerial vehicles-base station (UAV-BS) u is set to cover only a subset of a trajectory point at a given timeslot T. In addition, a subset with respect to each UAV-BS u configured of trajectory points is set to satisfy Expression 13-1 below.

$$\mathcal{P}_u \mathcal{P}, \mathcal{P}_u \cap \mathcal{P}_{u'} = \emptyset \text{ where } u \neq u'. \quad \text{Expression 13-1}$$

As a result, an object of an energy-efficient unmanned aerial vehicles-base station (UAV-BS) navigation optimization problem can be set to find a cooperation trajectory path configuration of the unmanned aerial vehicles-base stations (UAV-BS), the cooperation trajectory path configuration maximizing total energy efficiency of an unmanned aerial vehicles-base station (UAV-BS) relay network to which energy and AoI indexes are applied. A formula of the optimization problem can be represented by Expressions 14 to 18 below.

$$\underset{\{\mathcal{P}_u\}_{u \in \mathcal{U}}}{\text{argmax}} \sum_{u \in \mathcal{U}} \eta(\mathcal{P}_u, u), \quad \text{Expression 14}$$

$$\bigcap_{u \in \mathcal{U}} \mathcal{P}_u = \{b\}, \forall u \in \mathcal{U}, \quad \text{Expression 15}$$

$$\bigcup_{u \in \mathcal{U}} \mathcal{P}_u = \mathcal{P}, \forall u \in \mathcal{U}, \quad \text{Expression 16}$$

$$\eta(\mathcal{P}_u, u) \geq \eta_{th}, \forall u \in \mathcal{U}, \quad \text{Expression 17}$$

$$\hat{\Delta}_b(\mathcal{P}_u) \leq \hat{\Delta}_b^{th}, \forall p \in \mathcal{P}_u \backslash \{b\}. \quad \text{Expression 18}$$

Expressions 15 to 18 are related to trajectory, energy efficiency, and AoI constraints, respectively. Expression 15 represents a non-overlapped trajectory of the unmanned aerial vehicles-base station (UAV-BS), except for a trajectory point of the ground base station (BS) at which an information update occurs. Expression 16 represents forming of a joint trajectory of the unmanned aerial vehicles-base station (UAV-BS) in which all trajectory points are interdependently included. In Expressions 17 and 18, both energy efficiency and age-of-information (AoI) metrics are combined with a determination variable $P_u$ which is a function of $P_u$. In Expression 17, total energy efficiency of the unmanned aerial vehicles-base station (UAV-BS) is secured such that communicating and moving energy is larger than a minimum energy efficiency threshold $\eta_{th}$. In Expression 18, satisfaction of a condition that average up-to-dateness of the information update by formation Pu is lower than an age-of-information (AoI) threshold $\hat{\Delta}_b^{th}$.

A Constraint of Expression 14 by Expression 18 reveals that the UAV-BSs jointly search different trajectory points not only in the energy efficiency constraint but also the AoI constraint that depends on up-to date information update from trajectory points at which calculation-oriented communication applications have different performances from each other.

A determination problem of Expression 14 is a constraint thereof and can be reduced to a basic problem of a vertex cover problem (for example, maximum clique problem) with NP-complete Expressions 15 to 18. Similarly to the maximum clique problem, Expression 14 is fundamentally combinative. Further, regarding a solution to Expression 14, there is no known polynomial algorithm by which whether the solution of Expression 14 is optimal can be known when the solution of Expression is given. Hence, the determination problem of Expression 14 can be inferred to belong to the same category as that of the vertex cover problem proved to be an NP-hard problem.

Hereinafter, Expressions 14 to 18 described above will be described in more detail by using a deep Q-learning technique.

<Proposed Trajectory Policy Algorithm Based on Deep Q-Learning>

Hereinafter, a deep Q-learning model obtained by combining a deep neural network and a Q-learning algorithm will be described. The deep Q-learning model can be realized and executed by the multi-access edge computing server (MEC).

Figure 4:
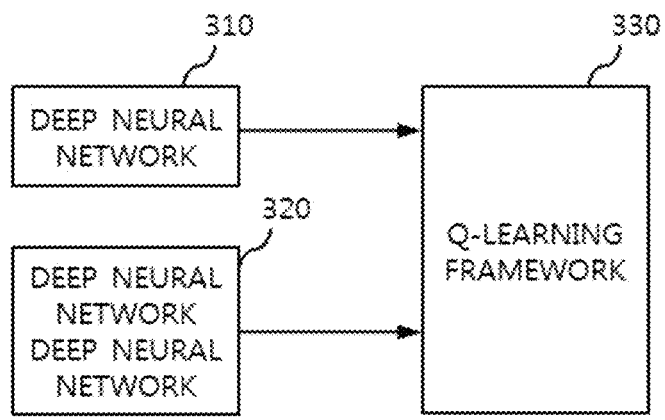
FIG. 4 is a diagram illustrating an example of a deep Q-learning model executed by a multi-access edge computing server of a ground base station.

FIG. 4 is a diagram illustrating an example of the deep Q-learning model executed by the multi-access edge computing server of the ground base station.

With reference to FIG. 4, a deep Q-learning model 300 includes a deep neural network 310, an experience replay memory 320, and a Q-learning framework 330.

The deep neural network 310 operates to decrease a size of a state space used to extract a characteristic (for example, AoI or energy consumption quantity) for each situation, the characteristic being used for unmanned aerial vehicles-base station (UAV-BS) navigation.

The experience replay memory 320 can store a state change which is observed by an unmanned aerial vehicles-base station (UAV-BS) agent.

The Q-learning framework 330 executes Q-learning for finding an optimal trajectory policy to achieve Expression 14 which is an aim of the problem, by using Expressions 15 to 18 which are the constraints described above.

The deep Q-learning model is a free model and thus does not need to have a network dynamic model. Further, use of an experience replay in the proposed approach method breaks time dependence between observations used in training of the deep neural network, and thus stability is ensured.

First, modeling of a state of the problem and an action space represented by Expression 14 is performed, and modeling of a reward and control policy based on Expression 14 having the corresponding constraints is performed. Finally, a training and test model proposed for a trajectory policy of the unmanned aerial vehicles-base station (UAV-BS) will be described.

A. State and Action Space

The state space for the trajectory policy of the unmanned aerial vehicles-base station (UAV-BS) is a four-dimensional state space. The ground base station (BS) can set the four-dimensional state space for the trajectory policy of the unmanned aerial vehicles-base station.

At each time step t, t={1, 2, 3, . . . , T} is satisfied, and the multi-access edge computing server (MEC) provided in the ground base station (BS) provides a virtual learning agent. A state or a joint observation space of the virtual learning agent is represented by S, and S can be expressed as Expression 18-1 below.

$$S = \{s_t = (p^u_{current}, P_{end}, \eta, \Delta) | \eta \in [0, \eta_{th}], \Delta \in [1, \hat{\Delta}^{th}_b]\} \quad \text{Expression 18-1}$$

Here, $p^u_{current}$ represents a current location of the unmanned aerial vehicles-base station (UAV-BS) u at the altitude $h_u$, $p_{end}$ represents a target location, η represents average energy efficiency of the UAV-BSs, and Δ represents average age for optimizing a search.

In addition, a trajectory location for the search of the unmanned aerial vehicles-base station (UAV-BS) u is obtained using $x_u \in [0, X_u]$ and $y_u \in [0, Y_u]$. Here, $X_u$ and $Y_u$ represent maximum coordinates of a specific geographic location. In addition, an initial location of each unmanned aerial vehicles-base station (UAV-BS) is randomly assigned together with the number of IoT devices. A lower limit and an upper limit of continuous state variables η and Δ in the state space are corrected on actual trajectory data.

The action space of the unmanned aerial vehicles-base stations (UAV-BS) is a trajectory for planning navigation of each of the UAV-BSs to the next state in one executable state (for example, location), while the trajectory and communication constraints (for example, constraints represented by Expressions 14 to 18 described above) are met. The action space can be set by setting navigation to the next state in one executable state, while each of the unmanned aerial vehicles-base stations (UAV-BS) meets the trajectory and communication constraints.

The virtual learning agent selects an action $a_t$ from an action set which can be used in a state $S_t$, and $a_t$ satisfies $a_t \in \mathcal{A}_{s_t} \subset \mathcal{A}$.

$$\mathcal{A} = \{a_1, \ldots, a_U\} = \{\mathcal{P}_u\}_{u \in U}$$

is satisfied, and $\mathcal{A}$ is a configuration of unmanned aerial vehicles-base station (UAV-BS) navigation.

The ground base station (BS) can set a reward based on collision of a waypoint to a plurality of action spaces set by a plurality of unmanned aerial vehicles-base stations (UAV-BS), respectively, in any state.

Hereinafter, the setting of the reward will be described in more detail with an example of a design of the action space.

Example of the Action Space Design

Hereinafter, forming of the action space will be described with an example thereof.

For example, the following is assumed. Six trajectory waypoints P={1, 2, 3, 4, 5, 6} and two unmanned aerial vehicles-base stations (UAV-BS) $u_1$ and $u_2$ are present. In addition, a start point of the unmanned aerial vehicles-base station (UAV-BS) is random, and thus start points of the UAV-BS $u_1$ and UAV-BS $u_2$ are set as 1 and 2, respectively. In addition, the ground base station (BS) is located at 6, and all of the UAV-BSs have to reach the corresponding location to execute information update.

Hence, a target location of the unmanned aerial vehicles-base stations (UAV-BS) $u_1$ and $u_2$ is fixed to the location 6. Then, an action space A is defined as a combination of trajectory points of P.

Hence, the UAV-BSs $u_1$ and $u_2$ can select two elements from combination set actions a1={1, 4, 6} and a2={2, 3, 6}, in a trajectory waypoint combination set of a time $t_1$, and the two elements are indexed in $A_{s_{t1}}$, as a joint action $a_{t1}$ in a state $s_{t1}$. It is possible to find that waypoints of the UAV-BSs $u_1$ and $u_2$ do not overlap each other with the action $a_{t1}$ at the time $t_1$ in the state $s_{t1}$. At that time point, when the other constraints are not violated, the system sets a reward for the action $a_{t1}$ in the state $s_{t1}$.

Meanwhile, when the UAV-BSs $u_1$ and $u_2$ select a1={1, 4, 6} and a2={2, 4, 6} as a joint action $a_{t2}$, respectively, in the state $s_{t1}$ and a time $t_2$, waypoints thereof overlap each other. Hence, the system sets a penalty reward.

B. Reward and Control Policy

When the virtual learning agent realizes the action $a_t$, an environment moves to a new state $s_{t+1}$. As soon as a change $(s_t, a_t, s_{t+i})$ occurs, an immediate reward $R_{t+1}$ is connected, and the virtual learning agent receives a reward through feedback. In other words, in each state change, the virtual learning agent receives an immediate reward used to form a trajectory control policy for a search. For future use, the trajectory control policy is used by a virtual learning agent that performs mapping of a current state to an optimal control action. The immediate reward can be formulated with an instant energy efficiency metric of the unmanned aerial vehicles-base station (UAV-BS) and can be defined as Expression 19 below.

$$R_t(a_t) = \begin{cases} \alpha_1 \eta(a_t), & \text{if constraints (15)-(18) of (14) are true} \\ -\alpha_1, & \text{if constraints (15)-(17) of (14) are violated} \\ 0, & \text{otherwise.} \end{cases} \quad \text{Expression 19}$$

Here, $\alpha_1$ represents a coefficient multiplied by an energy efficiency function and can be used to apply a penalty to the virtual learning agent when a trajectory constraint is violated. However, when the constraints of Expression 14 by Expression 18 are violated, and when an information update of trajectory waypoints becomes outdated with respect to the calculation-oriented communication (COC) application, the system does not receive a reward. In other words, the system receives zero rewards.

Hence, an aim of the virtual learning agent with respect to the timeslot T is optimization of the future reward defined as Expression 20 below.

$$\hat{R}(s, \alpha; t) = \sum_{t_0=0}^{T} \gamma \times R_{t-t_0}(a_t), \quad \text{Expression 20}$$

Here, here, $\gamma \in [0, 1]$ reflects contradiction between the immediate reward and the importance of the future reward. A reward $R_t(a_t)$ is changed depending on an energy efficiency metric of the unmanned aerial vehicles-base station (UAV-BS) due to joint movement—operation—from one trajectory waypoint to the next waypoint at different timeslots during a T period. Hence, $R_{t-t0}(a)$ represents a reward difference between two timeslots.

Expression 20 is a reward function, and the reward function is acquired at the time t, after the current state of the unmanned aerial vehicles-base station (UAV-BS) is learned during a period of the last T time step.

Hence, a control policy for the virtual learning agent in which a Q-function or an action-value function is defined as Expression 21 can be defined as π.

$$Q^\pi(s, a) = \hat{R}(s, a) + \gamma \sum_{a' \in S} P^a_{s,s'} \sum_{a' \in A} \pi(a' | s') Q^\pi(s', a'). \quad \text{Expression 21}$$

Here, $P_{s,s'}$ represents a transition probability of an environmental state, here, $s'=s_{t+1}$, $\pi$ represents a control policy, and an action a is executed by an environment simulator. State and reward updates are executed based on information received by the ground base station (BS).

Hereinafter, Expression 21 and the Q-function will be described in more detail with reference to Expressions 21-1 to 21-8.

The Bellman equation is more suitable for finding an optimal policy and a value function to provide the maximum value, compared to all of the other value functions. In other words, a value of a state s is a value obtained by multiplying a reward obtained when the virtual learning agent leaves the corresponding state, a discounted value s0 of a state to which the virtual learning agent lands (arrives), and a change probability at which the virtual learning agent transfers.

In other words, the value of the state s is calculated as a value obtained by multiplying the reward received when the virtual learning agent leaves the corresponding state, a discounted value s' of a state to which the virtual learning agent arrives, and a change probability at which the virtual learning agent moves.

Hence, the Bellman equation with respect to the value function can be established as Expression 21-1 below.

$$V(s) = \mathbb{E}[R_{t'} + \gamma V(s_{t'}|s_t = s)], \quad \text{Expression 21-1}$$

Here, t'=t+1.

Meanwhile, by using Expression 1, in the Bellman expectation equation with respect the value function (for example, state-function function), the virtual learning agent can find a value of a specific state to which some policies $\pi$ defined as follows are applied, by Expression 21-2.

$$V^{\pi}(s) = \mathbb{E}^{\pi}[R_{t'} + \gamma V^{\pi}(s_{t'})|s_t = s] \quad \text{Expression 21-2}$$

Similarly, a state-operation value function (Q-function) can be established as Expression 21-3 below.

$$Q^{\pi}(s, a) = \mathbb{E}^{\pi}[R_{t'} + \gamma V^{\pi}(s_{t'}, a_{t'})|s_t = s, a_t = a] \quad \text{Expression 21-3}$$

Hence, when the agent calculates an average of Q-values, a value in a state can be established as Expression 21-4.

$$V^{\pi}(s) = \sum_{a \in A} \pi(a|s) Q^{\pi}(s, a). \quad \text{Expression 21-4}$$

Expression 21-2 provides connection between the state-value function and the state-operation function. However, the virtual learning agent has to evaluate an advantage with respect to the action a. Hence, the virtual learning agent calculates the advantage of the action a in the state s by Expression 21-5 below.

$$Q^{\pi}(s, a) = \hat{R}(s, a) + \gamma \sum_{a \in S} P_{s,s'}^{a} V^{\pi}(s'), \quad \text{Expression 21-5}$$

Here, P represents a transition probability.

An effect of a specific action a in accordance with the specific policy $\pi$ can be defined as Expression 21 described above. An aim of a model of Expression 21 is to obtain the best control policy $\pi^{opt}$, and thus a maximum Q-function can be defined as Expression 21-6 below.

$$Q^{\pi^{opt}}(s, a) = \mathbb{E}\left[\hat{R}(s, a) + \gamma \max_{a'} Q^{\pi^{opt}}(s', a')|s, a\right], \quad \text{Expression 21-6}$$

Here, a discounted cumulative state function can be defined as Expression 21-7 below.

$$V^{\pi^{opt}}(s) = \max_{a'} [Q^{\pi^{opt}}(s, a)]. \quad \text{Expression 21-7}$$

In order to derive an optimal control policy $\pi^{opt}$, the Q-function can be updated as Expression 21-8 below.

$$Q_{t'}(s, a) = \quad \text{Expression 21-8}$$
$$Q_t(s, a) + \psi\left(\hat{R}(s, a) + \gamma\left[\max_{a'} Q_t(s', a')\right] - Q_t(s, a)\right),$$

Here, t'=t+1 and a'=$a_{t+1}$ are satisfied, the Q-function is updated using a recursive mechanism, and $\psi$ represents a learning rate.

C. Training with Experience Replay

In a deep Q-network (DQN) approach method according to the invention, a method for optimally controlling a trajectory formation of the UAV-BS for a search during simulation is learned.

Hence, the Q-network needs to be trained, in which a target value for each trajectory observing environmental state is given by Expression 22 below.

$$yk = \hat{R}(s, a) + \gamma \max_{a'} Q(s', a'; \theta_k). \quad \text{Expression 22}$$

Here, $\theta_k$ represents a network weight value obtained through training during K-th repetition. By using Expression 22, a loss function of a training network can be represented by Expression 23 below.

$$\mathcal{L}(\theta) = \quad \text{Expression 24}$$
$$\mathbb{E}_{(s,a,r,s') \sim U(M)}\left[\left(R + \gamma \max_{a'} Q^{\pi^{opt}}(s', a'; \theta^-) - Q(s, a; \theta)\right)^2\right].$$

Here, $\rho(s, a)$ represents a probability distribution with respect to a sequence s and an action a, and $y_k$ represents a target value of the training network derived from Expression 22. In addition, an optimal network weight value $\theta^{opt}$ can be obtained through training.

In addition, in order to intensify and stabilize training of the deep Q-network (DQN), practice problems are randomly collected from every education episode step $e_t=(s_t, a_t, R_t(a_t), s_{t'})$ in a replay memory $M_t=\{e_1, \ldots, E\}$ having a fixed size, by applying a mini-batch method. Hence, one sample is used many times in learning, and thus data efficiency can be significantly enhanced.

As a result, by using Expression 22, a loss function of Expression 23 indicates a uniform distribution for $\mathcal{M}$ and is expressed as Expression 24 below.

Expression 24

$$\mathcal{L}(\theta) = \\ \mathbb{E}_{(s,a,r,s') \sim U(\mathcal{M})}\left[\left(R + \gamma \max_{a'} Q^{\pi^{opt}}(s', a'; \theta^-) - Q(s, a; \theta)\right)^2\right].$$

Here, $U(\mathcal{M})$ represents the uniform distribution with respect to an experience replay memory $\mathcal{M}$, and $\theta^-$ represents a stored weight parameter of the deep Q-network (DQN). A loss function of Expression 24 can be expressed as Expression 25 below, by applying a gradient descent method.

$$\nabla_{\theta_k} \mathcal{L}_k(\theta_k) = \\ \mathbb{E}_{(s,a,r,s') \sim U(\mathcal{M})}\left[\left(R + \gamma \max_{a'} Q^{\pi^{opt}}(s', a'; \theta_k^-) - Q(s, a; \theta_k)\right) \\ \nabla_{\theta_k} Q(s, a; \theta_k)\right].$$

Expression 25

FIG. 5 is a diagram for illustrating an experience replaying deep Q-network algorithm for optimizing a UAV-BS trajectory policy according to the example of the invention.

With reference to FIG. 5, the deep Q-network algorithm is described in more detail.

In a first step (Step 1), network parameters are first randomly initialized, and a target deep Q-network (DQN) is set having the same network structure as that of an original deep Q-network (DQN) (first and second lines).

Then, in every training episode step $e_t$, the energy efficiency metric is calculated using Expression 11. Here, navigation and communication parameters are obtained using Expressions 1 to 11 (seventh line).

As a part of an E-greedy policy framework, the energy efficiency metric is used to calculate a reward function in an exploration step, and an action is derived from a current deep Q-network (DQN) having an exploration probability $\epsilon$ (eighth line).

The reward function is obtained by regarding age-of-information (AoI) context together with the other constraints of Expression 14, and transition to the next state $S_{t'}$ in which $t'=t+1$ is performed (ninth line).

In addition, through the exploration step, the UAV-BS can search for every joint action for achieving a better reward value that is useful in selecting an appropriate action with highest energy efficiency.

Then, in order to eliminate correlation between observation sequences, a change in observation data distribution can be smoothed by applying the mini-batch method in which experiences of a replay memory buffer are randomly mixed (tenth and eleventh lines).

Then, a stochastic gradient descent (SGD) algorithm that uses the training loss function to perform training for the deep Q-network (DQN) can be adopted, and a network parameter P and a network bias can be updated (twelfth and thirteenth lines).

When the UAV-BS reaches a terminal trajectory, and the DQN is finally stored for a test, a training process is ended (fourteenth line).

D. Testing UAV-BS Trajectory Policy

FIG. 6 is a diagram for illustrating an algorithm for a DQN test through an experience replay for optimizing the UAV-BS trajectory policy according to the example of the invention.

With reference to FIG. 6, the UAV-BS trajectory policy network stored in the training step is used at a location at which Rt of the UAV-BS is searched at a timeslot t (first to third lines).

As a part of attack in a test step, the action $a_t$ is selected for joint UAV-BS navigation in which a trajectory of the UAV-BS and target values of DQN are both updated.

<Performance Evaluation>

Hereinafter, a performance analysis experimental environment according to the example of the invention will be described with various key indicators. Then, a result obtained from an experiment is described, and observation results from simulation results are finally disclosed.

In order to train for the deep neural network (DNN), a neural network structure having two fully connected (FC) hidden layers having 100 hidden nodes is assumed. In addition, a size M of the experience replay memory is set to 200. The simulation result is calculated using an average value obtained in 100 simulations and a normal value.

A. Experiment Setting

FIG. 7 is a diagram illustrating a setting for a simulation according to the example of the invention. As illustrated in FIG. 7, simulation parameters are set, and a simulation is performed.

B. Convergence Analysis of the Neural Network

Figure 8:
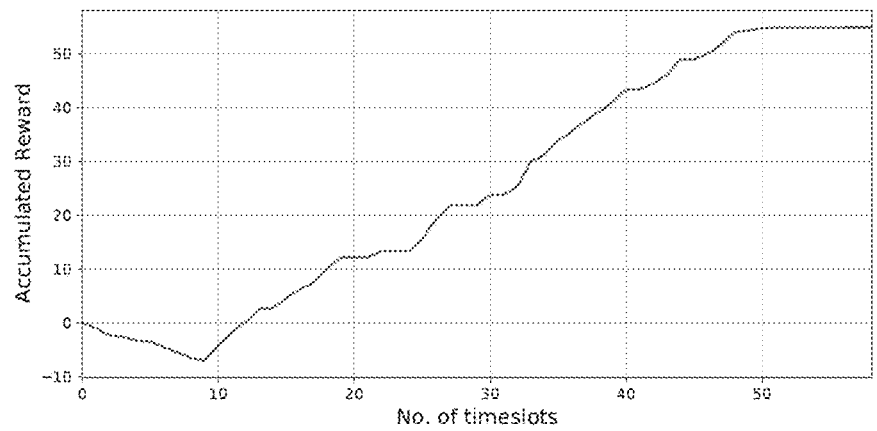
FIG. 8 is a graph illustrating evaluation of accumulated rewards with a function of the number of timeslots, according to a simulation result of the invention.

FIG. 8 is a graph illustrating evaluation of accumulated rewards with a function of the number of timeslots, according to the simulation result of the invention.

With reference to FIG. 8, several statistical characteristics of the reward function according to the invention are observed. An asymptotic gradient indicates an effect of the trajectory policy of the UAV-BS after the approach method proposed by a reward set from Expression 19 is stabilized. In addition, the lowest point (for example, point at nine timeslots) of the curve illustrates that how much reward is demanded before the proposed approach method starts to be improved. This phenomenon occurs because, when the UAV-BS starts at a fixed point, all of the UAV-BSs perform a search randomly, and thus a penalty increases since low-energy-efficient or overlapped trajectory waypoints are likely to be selected.

As accumulated rewards after timeslots 10 are marked with a plus sign, a reward setting has a phenomenon in which the reward increases to be accumulated. That indicates a time jointly taken for the UAV-BSs, until navigation environment learning costs are recovered by the approach method according to the invention.

Meanwhile, the lowest and the intersecting point with zero in FIG. 5 indicate that the algorithm proposed by a reward design of Expression 19 by which positive rewards and negative rewards are all regarded fulfills a balanced reasonable operation.

Since the accumulated reward is measured by considering total rewards, the following can be known. The proposed algorithm optimizes a discount reward in each step to the last time step to converge to an executable solution (for example, executable trajectory policy).

C. Finding Appropriate Discount Factor and AoI Threshold

Hereinafter, simulation results for finding an appropriate discount factor and age-of-information (AoI) threshold for the proposed deep Q-network according to the embodiment of the invention by using a replay memory approach method will be described.

FIG. 9 is a table illustrating examples of the discount factor and the age-of-information (AoI) threshold which are applied to the simulation.

In Tables 2 and 3 illustrated in FIG. 9, the appropriate discount factor and AoI threshold are evaluated considering an average energy efficiency metric, and the number of trajectory points is set to $|\mathcal{P}|=14$.

Table 2 illustrates what effect the discount factor has on the energy efficiency. More specifically, in a case of the proposed DQN including the replay memory, when the discount factor increases, the energy efficiency metric increases to 1.73%, when the discount factor $\gamma$ is 0.5. On the other hand, an energy efficiency metric with respect to a baseline DQN slightly decreases to 0.23%, when the discount factor $\gamma$ is 0.5, and the energy efficiency metric maintains the decrease, until the discount factor $\gamma$ reaches 0.6.

Similarly, the energy efficiency metric with respect to the proposed approach method is slightly changed, when the discount factor $\gamma$ is 0.6. However, to that time point, the proposed DQN including the replay memory still exceeds the baseline DQN approach method. When $\gamma$ is 0.7, the energy efficiency metric is present at the highest point of the proposed DQN including the replay memory, and performance of the baseline DQN is significantly improved.

However, the higher a $\gamma$ value, the more performance of the two approach methods is significantly degraded. In the background of this phenomenon, when a value of the discount factor is small (for example, $\gamma<0.8$), the future reward is not so important, and the agent proceeds to a step in which the discount factor is smaller such that the agent performs an operation for increasing the immediate reward. That is not appropriate to reaching reasonable energy efficiency. On the other hand, as a value of the discount factor increases (for example, $\gamma>0.7$), the agent operates to seek benefits of future action to capture a temporary operation of the system. Hence, when the discount factor 7 is larger than 0.7, there is a concern that the UAV-BS agent ignores the immediate reward, as a result of paying too much attention to the future reward. Hence, the performance is degraded, and a battery of the UAV-BS is rapidly consumed, and thus a penalty can be caused. Hence, the discount factor $\gamma$ is set to 0.7 in the simulation.

After the discount factor $\gamma$ is fixed to 0.7 in Table 3, effects of a normalized average reward and various AoI thresholds of average AoI which enables inference of selecting an appropriate AoI threshold so as to find the trajectory policy for the UAV-BS are set.

The AoI threshold $\hat{\Delta}_b^{th}$ is set as four levels, that is, [0.3, 0.5, 0.7, and 0.9], and the balance between two performance metrics is checked.

When the AoI threshold $\hat{\Delta}_b^{th}$ is 0.3, the following can be found. A strict AoI threshold is set, and the normalized average reward is minimum, whereas the AoI is highest. This is normal, because the penalty increases due to the strict AoI threshold, and performance of the system is degraded in terms of the average accumulated reward. When strictness of the AoI threshold is alleviated (that is, $\hat{\Delta}_b^{th}>0.5$), the average AoI significantly decreases, and the average reward increases.

Meanwhile, when the threshold $\hat{\Delta}_b^{th}$ is 0.9, the reward value is largest, but effects of the AoI threshold is significantly reduced at that time point. Specifically, at that time point, the UAV-BS can ignore the up-to-dateness of the information update in an undesirable ground BS and can operate the system.

Hence, the AoI threshold $\hat{\Delta}_b^{th}$ permissible to balance the average reward and the AoI metric can be set to 0.7.

D. Experiment Results

Figure 10:
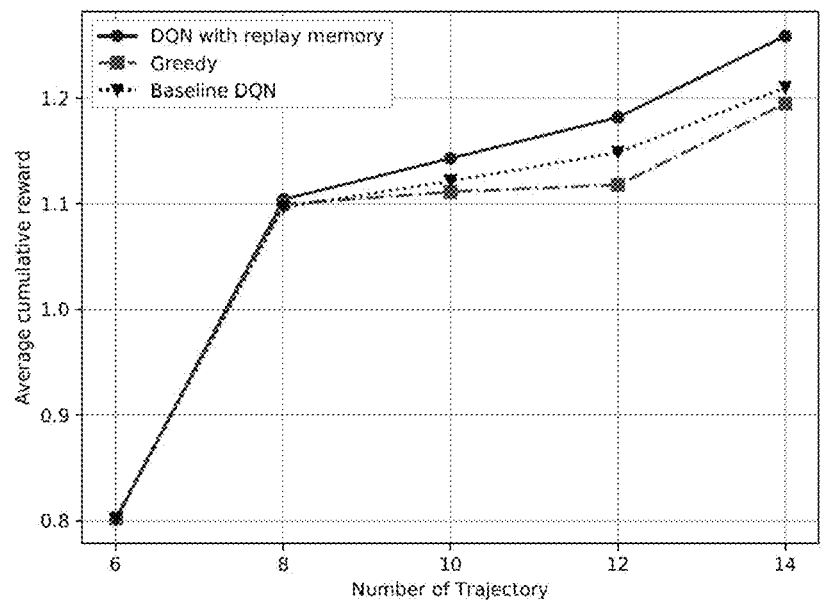
FIG. 10 is a graph illustrating an average accumulated reward depending on the number of trajectory waypoints, as the simulation result according to the invention.

FIG. 10 is a graph illustrating the average accumulated reward depending on the number of trajectory waypoints, as the simulation result according to the invention.

In FIG. 10, the methods can be compared to each other in terms of the average accumulated reward as the number of trajectory waypoints increases. When the number of trajectory points is small (for example, maximum $|\mathcal{P}|=8$), a difference in performance between the methods is clear due to a lower density of waypoints in a geographic environment. However, when the number of trajectory points increases, the difference in performance between the approach methods significantly increases.

More specifically, the proposed deep Q-network (DQN) using the replay memory approach method exhibits performance more increased to 2.84% and 1.91% than an existing greedy DQN and the baseline DQN do.

In a case of highly dense trajectory waypoints (for example, $|\mathcal{P}|=14$), the performance of the proposed DQN with a replay buffer increases by 5.08% and 4.02% or higher than that of the greedy DQN and the baseline DQN do, respectively, and thus the difference in performance between the approach methods further increases.

One of some characteristics of the proposed model is minimization of the age-of-information (AoI) metric during finding a policy for searching for the UAV-BS.

Figure 11:
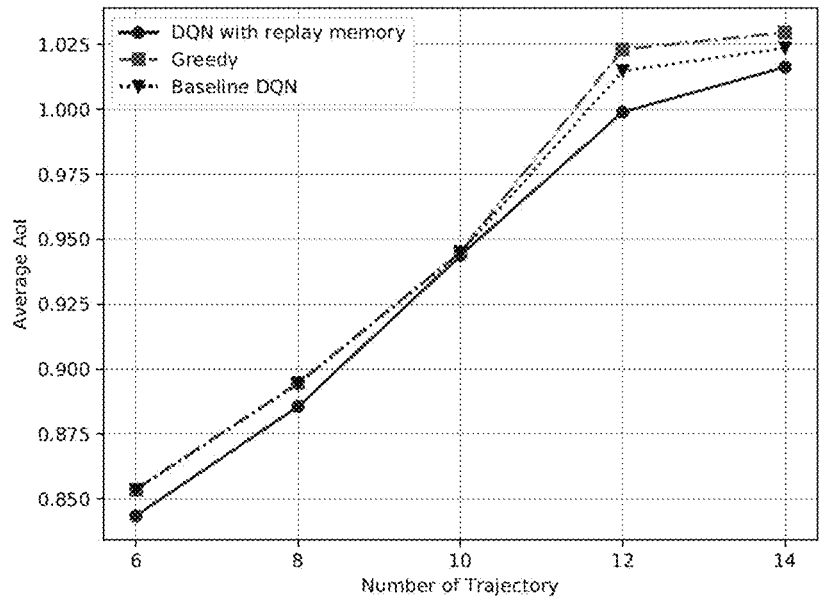
FIG. 11 is a graph illustrating comparison of average AoI between a proposed approach method and another approach method with respect to the number of different trajectory waypoints, as the simulation result according to the invention.

FIG. 11 is a graph illustrating comparison of the average AoI between the proposed approach method and another approach method with respect to the number of different trajectory waypoints, as the simulation result according to the invention. With reference to FIG. 11, performance of the greedy DQN and baseline DQN approach methods and the performance of the DQN using the proposed replay memory are compared to each other.

As illustrated in FIG. 11, the proposed approach method has an effect of reducing the average age of information (AoI) to 1.21% and 1.17%. A difference in performance between different approach methods increases gradually until $|\mathcal{P}|=8$. When $|\mathcal{P}|=10$, it is possible to find that performance of an approach method is slightly changed, because the simulations are independently performed with the different number of trajectory points in the experiment. However, as the number of trajectory waypoints increases, the tendency of the approach method proposed to reduce the AoI metric is maintained. When $|\mathcal{P}|=14$, the performance of the proposed DQN has a difference increased by 0.72% and 1.29%, compared to the greedy DQN and baseline DQN approach methods.

Figure 12:
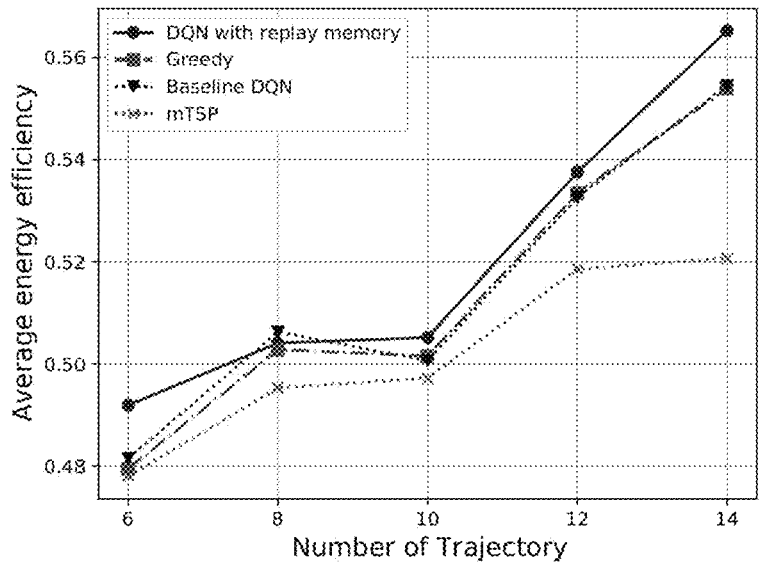
FIG. 12 is a graph illustrating comparison of average energy efficiency between the proposed approach method and the other approach method with respect to the number of different trajectory waypoints, as the simulation result according to the invention.

FIG. 12 is a graph illustrating comparison of the average energy efficiency between the proposed approach method and the other approach method with respect to the number of different trajectory waypoints, as the simulation result according to the invention.

With reference to FIG. 12, performance of the reference approach method and the performance of the proposed DQN including the replay memory are compared to each other in terms of the average energy efficiency.

The following is observed. The proposed DQN including the replay memory exhibits better performance gradually than the baseline DQN approach method does. In this respect, the following can be found. When the number of trajectory waypoints is relatively large (for example, |

$|\mathcal{P}|=10$), the energy efficiency of the proposed DQN including the replay memory is higher by 0.32% and 1.97% than that of the greedy DQN and the baseline DQN do, respectively.

On the other hand, mTSP exhibits the worst performance, compared to all of the other approach method. This is because, the more the trajectory waypoints are, the more the trajectory space of the UAV-BS increases, and thus the average energy consumption of the UAV-BS significantly increases in a case of mTSP.

Each of the UAV-BSs is subjected to generation of energy costs for the search at each time slot t and has to move to an adjacent waypoint from one trajectory waypoint, in order to provide service to the IoT device that consumes a battery much faster than any other approach methods does.

For example, the following can be found. The more the trajectory waypoints, the more energy efficient the proposed approach method, when $|\mathcal{P}|=14$. In other words, the proposed approach method is more efficient by 3.6%, 3.13%, and 7.87% as the maximum percent, compared to a comparison target.

Figure 13:
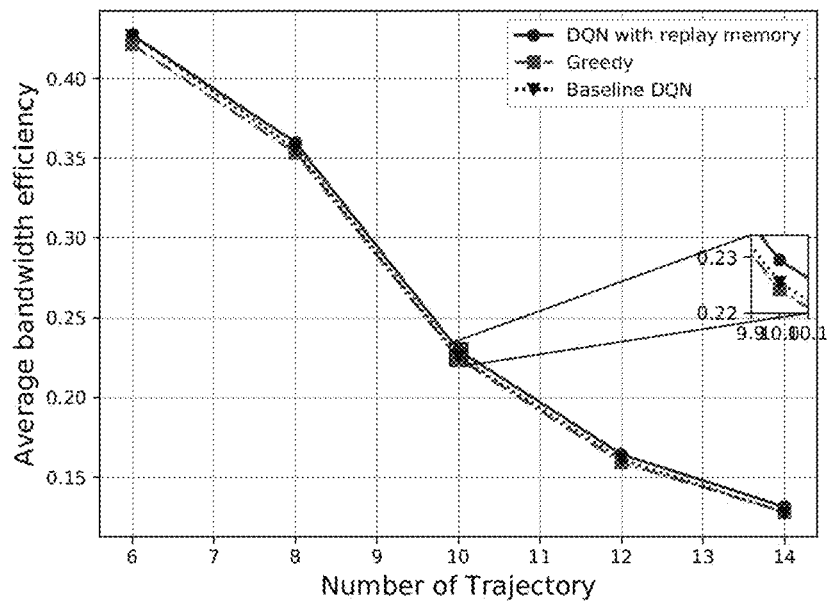
FIG. 13 is a graph illustrating comparison of average bandwidth efficiency between the proposed approach method and the other approach method with respect to the number of different trajectory waypoints, as the simulation result according to the invention.

As the number of IoT devices increases at the trajectory point, front-haul capacity is limited, and thus a bandwidth has to be efficiently used. FIG. 13 is a graph illustrating comparison of average bandwidth efficiency between the proposed approach method and the other approach method with respect to the number of different trajectory waypoints, as the simulation result according to the invention. With reference to FIG. 13, efficiency of the proposed approach method is compared to the number of various trajectory points and the density of various IoT devices, by comparing the greedy DQN and the baseline DQN.

The proposed DQN including the replay buffer efficiently uses front-haul and back-haul bandwidths, while moving across different trajectory waypoints. Very similar average bandwidth efficiency is obtained, when the number of trajectory points is small and a distance between the points is long in an environment. Hence, an interference level which is supplied from another UAV-BS and is received by the IoT device is small in all of the methods.

However, as the number of IoT devices increases (for example, $|\mathcal{P}|=10$), all of the approach method face interference on a network with dense trajectory waypoints, and the bandwidth efficiency tends to decrease. Nevertheless, the proposed DQN with the replay buffer has efficiency higher than the greedy DQN and the baseline DQN by 2.41% and 2.87%, in terms of ensuring the bandwidth efficiency still.

Figure 14:
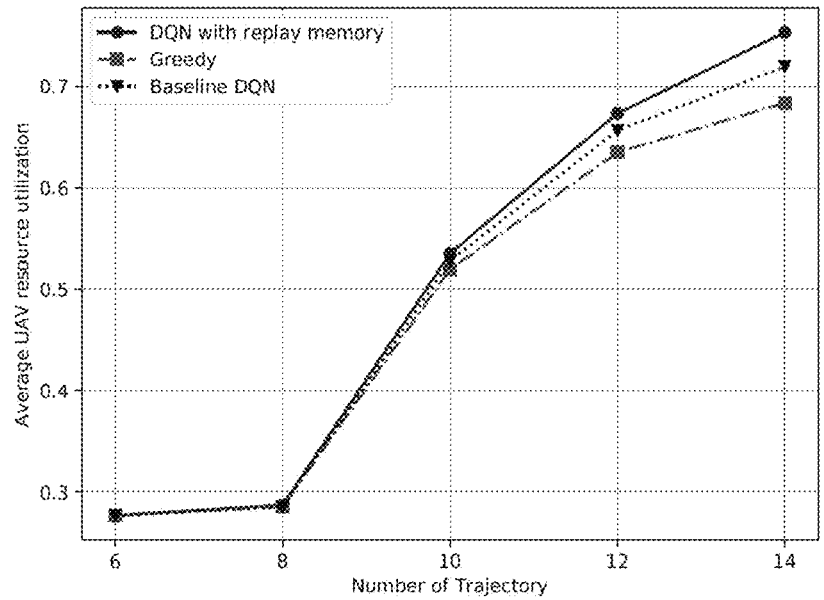
FIG. 14 is a graph illustrating comparison of average UAV resource utilization between the proposed approach method and the other approach method with respect to the number of different trajectory waypoints, as the simulation result according to the invention.

FIG. 14 is a graph illustrating comparison of average UAV resource utilization between the proposed approach method and the other approach method with respect to the number of different trajectory waypoints, as the simulation result according to the invention.

FIG. 14 illustrates use of the UAV-BSs or network resources in the proposed approach method and the other two baseline approach methods. As the number of trajectory waypoints increases, the number of connections per UAV-BS increases, and thus the number of IoT devices which use the network resources of the UAV-BS also increases. In a case of the fixed number of UAV-BSs (for example, $|\mathcal{U}|=3$), an IoT device at another trajectory waypoint tends to use maximum network resources provided by the UAV-BS. However, the following can be found. Since the proposed DQN with the replay buffer more efficiently covers the trajectory waypoints than the baseline approach method does, the network resources provided by the UAV-BS is more efficiently used by 9.26% and 4.71% than on the greedy DQN and the baseline DQN.

Figure 15:
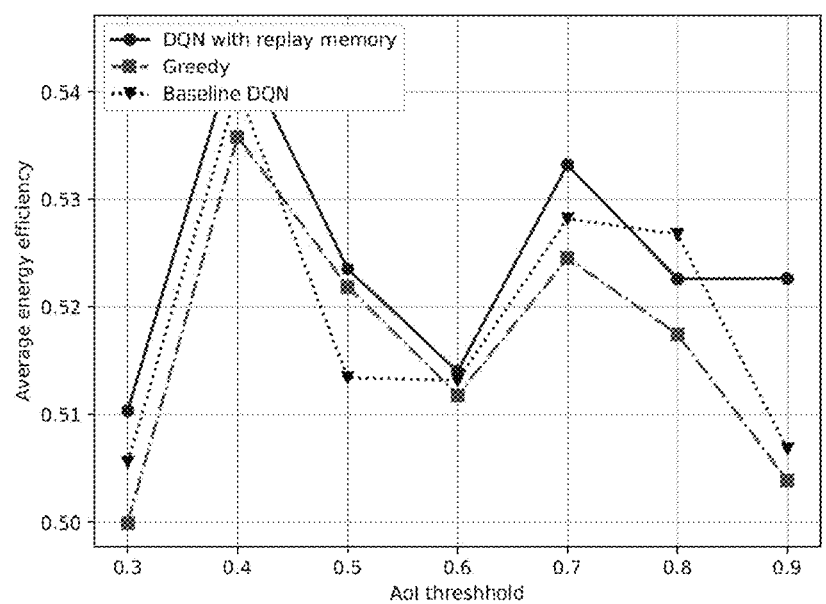
FIG. 15 is a graph illustrating average energy efficiency of UAV-BSs operated under different AoI thresholds, as the simulation result according to the invention.

FIG. 15 is a graph illustrating the average energy efficiency of the UAV-BSs operated under different AoI thresholds, as the simulation result according to the invention.

The following can be found. With reference to FIG. 15, when relatively alleviated AoI threshold $\hat{A}_b^{th}=7$, the energy efficiency of the UAV-BS using the proposed approach method is higher by 1.63% and 0.95% than that of the greedy DQN and the baseline DQN is, respectively. In other words, the energy efficiency of the UAV-BS using the proposed approach method is higher by 1.63% and 0.95% than that of the greedy DQN and the baseline DQN is, respectively.

Hereinafter, the multiple unmanned aerial vehicles navigation optimization method according to another example of the invention will be described. The multiple unmanned aerial vehicles navigation optimization method according to the other example of the invention to be described below is executed at the ground base station included in the unmanned aerial networks system described above with reference to FIGS. 1 to 15. Hence, the multiple unmanned aerial vehicles navigation optimization method can be easily understood with reference to the above-provided description with reference to FIGS. 1 to 15.

Figure 16:
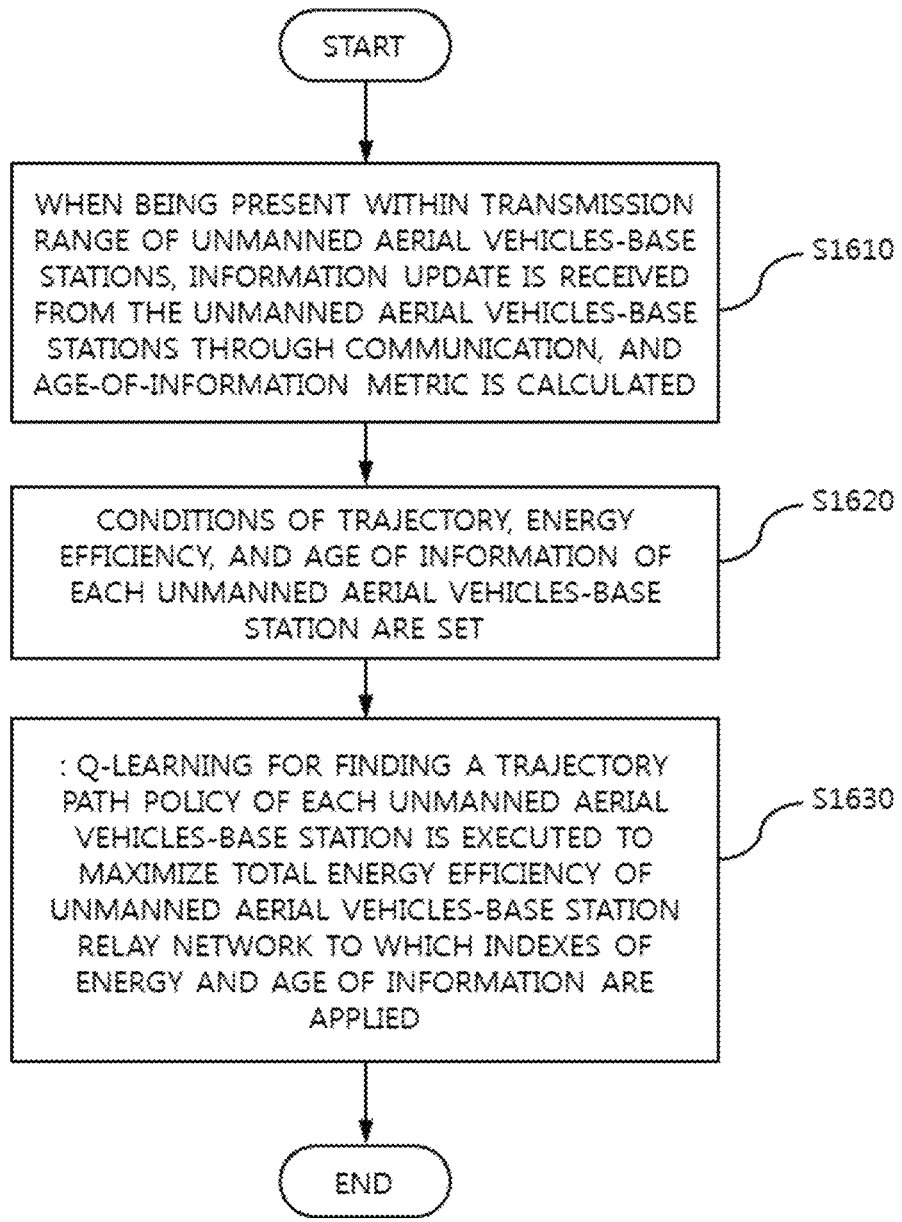
FIG. 16 is a flowchart illustrating a multiple unmanned aerial vehicles navigation optimization method according to another example of the invention.

FIG. 16 is a flowchart illustrating the multiple unmanned aerial vehicles navigation optimization method according to the other example of the invention.

With reference to FIG. 16, the ground base station (BS) can calculate the age-of-information metric by receiving the information update from the unmanned aerial vehicles-base stations through communication, when the ground base station is present within a transmission range of the unmanned aerial vehicles-base stations (S1610).

The ground base station (BS) can set the conditions of the trajectory, the energy efficiency, and the age of information of each of the unmanned aerial vehicles-base stations (S1620).

The ground base station (BS) can execute the Q-learning for finding the trajectory path policy of each unmanned aerial vehicles-base station, so as to maximize total energy efficiency of an unmanned aerial vehicles-base station relay network to which the energy efficiency and the age of information are applied (S1630).

In the other example, before Step S1610 of calculating the age-of-information metric, the ground base station (BS) can calculate receiving electric power supplied from the unmanned aerial vehicles-base stations, can generate a back-haul link by calculating the back-haul capacity between the unmanned aerial vehicles-base stations and the ground base station by using the receiving electric power, and can calculate transmission energy of the unmanned aerial vehicles-base stations while the back-haul link is used at a time t. The step can be understood with reference to the above-provided description with reference to Expressions 1 to 7-1.

In the other example, regarding Step S1620, the ground base station (BS) can set each of the unmanned aerial vehicles-base stations to cover only a subset of the trajectory point at a given timeslot, can set a subset for each of the unmanned aerial vehicles-base stations to satisfy a limitation condition, the unmanned aerial vehicles-base stations configured of the trajectory point.

Additionally, the ground base station (BS) can set a non-overlapped trajectory of an unmanned aerial vehicles-base station, as a trajectory condition of the unmanned aerial vehicles-base station, except for a trajectory point of the ground base station at which an information update occurs, and can form a joint trajectory of the unmanned aerial vehicles-base stations in which trajectory points are all interdependently included. The ground base station (BS) can secure total energy efficiency of the unmanned aerial vehicles-base stations such that communicating and moving energy is larger than a minimum energy efficiency threshold, and can secure satisfaction of a condition that average up-to-dateness of the information update is lower than the age-of-information threshold.

In the other example, regarding Step S1630, the ground base station (BS) can set the four-dimensional state space for the trajectory policy of the unmanned aerial vehicles-base stations, and an action space by setting navigation to the next state in one executable state, while each of the unmanned aerial vehicles-base stations meets trajectory and communication constraints. The ground base station (BS) can set the reward based on collision of a waypoint to a plurality of action spaces set by a plurality of unmanned aerial vehicles-base stations, respectively, in any state.

In the example, regarding Step S1630, the ground base station (BS) can decrease the size of the state space used to extract a characteristic for each situation, the characteristic being used for unmanned aerial vehicles-base station navigation and can store the state change which is observed by the unmanned aerial vehicles-base station agent, in order to set the reward based on the collision of the waypoint. The ground base station (BS) can execute the Q-learning for finding the trajectory path policy of the unmanned aerial vehicles-base stations, so as to maximize total energy efficiency of the unmanned aerial vehicles-base station relay network to which indexes of energy and the age of information are applied. The step can be understood with reference to the above-provided description with reference to Expressions 18-1 to 25.

The invention described above is not limited to the examples and the accompanying drawings described above but is limited to the claims to be described below. It is possible for a person of ordinary knowledge in the technical field to which the invention belongs to easily know that the configurations of the invention can be variously modified and renovated within the scope without departing from technical ideas of the invention.

While the present invention has been described with respect to the specific embodiments, it will be apparent to those skilled in the art that various changes and modifications may be made without departing from the spirit and scope of the invention as defined in the following claims.

What is claimed is:

1. A multiple unmanned aerial vehicles navigation optimization method that is performed at a ground base station which operates in conjunction with unmanned aerial vehicles-base stations which are driven by a battery to move and cover a given trajectory point set, the multiple unmanned aerial vehicles navigation optimization method comprising:

calculating an age-of-information metric by receiving an information update from the unmanned aerial vehicles-base stations through communication, when the ground base station is present within a transmission range of the unmanned aerial vehicles-base stations;

setting conditions of a trajectory, energy efficiency, and age of information of each of the unmanned aerial vehicles-base stations;

executing Q-learning for finding a trajectory path policy of each of the unmanned aerial vehicles-base stations, so as to maximize total energy efficiency of an unmanned aerial vehicles-base station relay network to which the energy efficiency and the age of information are applied; and performing a relay function by the unmanned aerial vehicles-base stations according to the trajectory path policy to maximize the total energy efficiency.

2. The multiple unmanned aerial vehicles navigation optimization method according to claim 1, further comprising:

before the calculating of the age-of-information metric, calculating receiving electric power supplied from the unmanned aerial vehicles-base stations, generating a back-haul link by calculating back-haul capacity between the unmanned aerial vehicles-base stations and the ground base station by using the receiving electric power, and calculating transmission energy of the unmanned aerial vehicles-base stations while the back-haul link is used at a time t.

3. The multiple unmanned aerial vehicles navigation optimization method according to claim 2, wherein the receiving electric power is calculated in accordance with the following expression, $$\hat{P}_{b,u} = P_{b,u}^{tx} \cdot G_u^{tx} \cdot G_b^{rx} \left( \frac{c}{4\pi \delta_{b,u} f_c^{mmWave}} \right).$$

here, $P_{b,u}^{tx}$ representing transmitting electric power from an unmanned aerial vehicles-base station (UAV-BS) u to a ground base station (BS) b, $\delta_{b,u}$ representing a distance between the unmanned aerial vehicles-base station (UAV-BS) u and the ground base station (BS) b, c representing speed of light, $f_c^{mmWave}$ representing a carrier frequency of mmWave back-haul link, and $G_u^{tx}$ and $G_b^{rx}$ representing antenna gains of the transmitter UAV-BS u and the receiver BS b, respectively.

4. The multiple unmanned aerial vehicles navigation optimization method according to claim 2, wherein the back-haul capacity is calculated in accordance with the following expression, $$r_{b,u}^{mmWave}(t) = \begin{cases} \beta_{b,u}^{mmWave} \cdot \log\left(1 + \frac{\hat{P}_{b,u}}{\beta_{b,u}^{mmWave} \sigma^2}\right), & \text{if } \delta_{u,b} \leq \bar{\alpha}, \\ 0, & \text{otherwise} \end{cases}$$

here, $\beta_{b,u}^{mmWave}$ representing an mmWave back-haul bandwidth, and $\sigma^2$ representing added noise.

5. The multiple unmanned aerial vehicles navigation optimization method according to claim 1, wherein the setting of the conditions of the trajectory, the energy efficiency, and the age of information of each of the unmanned aerial vehicles-base stations includes:

setting each of the unmanned aerial vehicles-base stations to cover only a subset of a trajectory point at a given timeslot; and setting a subset for each of the unmanned aerial vehicles-base stations to satisfy a limitation condition, the unmanned aerial vehicles-base stations configured of the trajectory point.

6. The multiple unmanned aerial vehicles navigation optimization method according to claim 5, wherein the setting of the conditions of the trajectory, the energy efficiency, and the age of information of each of the unmanned aerial vehicles-base stations further includes:

setting a non-overlapped trajectory of an unmanned aerial vehicles-base station, as a trajectory condition of the unmanned aerial vehicles-base station, except for a trajectory point of the ground base station at which an information update occurs;

forming a joint trajectory of the unmanned aerial vehicles-base stations in which trajectory points are all interdependently included;

securing total energy efficiency of the unmanned aerial vehicles-base stations such that communicating and moving energy is larger than a minimum energy efficiency threshold; and securing satisfaction of a condition that average up-to-dateness of the information update is lower than an age-of-information threshold.

7. The multiple unmanned aerial vehicles navigation optimization method according to claim 1,
wherein the ground base station sets
a four-dimensional state space for a trajectory policy of the unmanned aerial vehicles-base stations, and
an action space by setting navigation to the next state in one executable state while each of the unmanned aerial vehicles-base stations meets trajectory and communication constraints, and
wherein the executing of the Q-learning for finding the trajectory path policy includes setting a reward based on collision of a waypoint to a plurality of action spaces set by a plurality of unmanned aerial vehicles-base stations, respectively, in any state.

8. The multiple unmanned aerial vehicles navigation optimization method according to claim 7,
wherein the setting of the reward based on the collision of the waypoint includes:
decreasing a size of a state space used to extract a characteristic for each situation, the characteristic being used for unmanned aerial vehicles-base station navigation;
storing a state change which is observed by an unmanned aerial vehicles-base station agent; and
executing Q-learning for finding a trajectory path policy of the unmanned aerial vehicles-base stations, so as to maximize total energy efficiency of an unmanned aerial vehicles-base station relay network to which indexes of energy and the age of information are applied.

9. The multiple unmanned aerial vehicles navigation optimization method according to claim 8,
wherein the executing of the Q-learning includes defining a future reward using the following expression, $$\hat{R}(s, a; t) = \sum_{t_o=0}^{T} \gamma \times R_{t-t_0}(a_t),$$

here, $\gamma \in [0, 1]$ being satisfied.

10. An unmanned aerial networks system comprising:
an Internet of Things (IoT) device set including IoT devices which are randomly located at different trajectory points included in the given trajectory point set;
an unmanned aerial vehicle set including a plurality of unmanned aerial vehicles-base stations which are driven by a battery to move and cover the given trajectory point set and perform a relay function of the IoT device set; and
a ground base station that receives an information update from the IoT devices through a relay by the unmanned aerial vehicle set and supports a computation-oriented communications application;
wherein the unmanned aerial vehicle is configured to perform the relay function according to a trajectory path policy to maximize the total energy efficiency.

11. The unmanned aerial networks system according to claim 10,
wherein the unmanned aerial vehicles-base stations pass through different trajectory points included in the trajectory point set over a finite time and collect an information data packet from an activated IoT device located around any trajectory point by using an uplink communication channel.

12. The unmanned aerial networks system according to claim 10,
wherein the unmanned aerial vehicles-base stations generate a back-haul communication link to a ground base station and transmit the information data packet collected via the generated back-haul communication link to the ground base station, when the ground base station is present within a transmission range of the unmanned aerial vehicles-base stations.

13. The unmanned aerial networks system according to claim 12,
wherein the ground base station includes a multi-access edge computing server, and
wherein the multi-access edge computing server performs an information update with respect to different trajectory points by using the information data packet transmitted from the unmanned aerial vehicles-base stations and calculates an age-of-information metric.

14. The unmanned aerial networks system according to claim 11,
wherein an air-to-ground path loss probability between the activated IoT device and the unmanned aerial vehicles-base stations is defined by the following expression, $$\zeta_{i,p}^{u} = \begin{cases} \dfrac{1}{1+\alpha\exp\left(-\hat{\alpha}\left(\dfrac{180}{\pi}\Theta_u - \alpha\right)\right)}, & LoS \text{ channel,} \\ 1 - \left[\dfrac{1}{1+\alpha\exp\left(-\hat{\alpha}\left(\dfrac{180}{\pi}\Theta_u - \alpha\right)\right)}\right], & NLoS \text{ channel} \end{cases}$$

here, $\alpha$ and $\hat{\alpha}$ representing environment-dependent constants for an LoS channel and an NLoS channel, respectively, and $\Theta_u$ representing an elevation angle of each of the unmanned aerial vehicles-base stations.

15. The unmanned aerial networks system according to claim 11,
wherein total energy efficiency of the unmanned aerial vehicles-base stations which cover a trajectory point P to provide service to IoT devices depending on an elapsed time T is defined by the following expression, $$|\eta(\mathcal{P}, u) = \sum_{t=1}^{T} \sum_{p=1}^{|\mathcal{P}|} \dfrac{\left(r_{b,u}^{mmWave}(t) + \sum_{i=1}^{|\mathcal{X}|} r_{i,p}^{u}(t)\right)}{\left(E_u^{mmWave}(t) + E_u(t)\right)}.$$

here, $r_{b,u}^{mmWave}(t)$ representing back-haul capacity of a channel between each of the unmanned aerial vehicles-base stations and the ground base station at a time t, and $E_u^{mmWave}(t)$ representing transmission energy of the unmanned aerial vehicles-base stations while a backhaul link is used at the time t.

16. The unmanned aerial networks system according to claim 10,
wherein the ground base station calculates age of information of a trajectory point p at the time t by using the following expression, $\Delta_u(\mathcal{P},t)=t-\Delta_u'(p,t), \forall p \in \mathcal{P}$.

here, $\Delta_u'(p, t)$ representing a time stamp of a latest data packet received by the ground base station, when the unmanned aerial vehicles-base stations are located at the trajectory point p.

17. The unmanned aerial networks system according to claim 10,
wherein the ground base station sets
a four-dimensional state space for a trajectory policy of the unmanned aerial vehicles-base stations, and
an action space by setting navigation to the next state in one executable state, while each of the unmanned aerial vehicles-base stations meets trajectory and communication constraints, and
wherein the ground base station sets a reward based on collision of a waypoint to a plurality of action spaces set by a plurality of unmanned aerial vehicles-base stations, respectively, in any state.

18. The unmanned aerial networks system according to claim 17,
wherein the ground base station generates a deep Q-learning model, and
wherein the deep Q-learning model includes:
a deep neural network that decreases a size of a state space used to extract a characteristic for each situation, the characteristic being used for unmanned aerial vehicles-base station navigation;
an experience replay memory that stores a state change which is observed by an unmanned aerial vehicles-base station agent; and
a Q-learning framework that executes Q-learning for finding a trajectory path policy of the unmanned aerial vehicles-base stations, so as to maximize total energy efficiency of an unmanned aerial vehicles-base station relay network to which indexes of energy and the age of information are applied.

19. The multiple unmanned aerial vehicles navigation optimization method according to claim 1 further comprising performing an autonomous search by the unmanned aerial vehicles-base stations according to the trajectory path policy to maximize the total energy efficiency.

20. An unmanned aerial networks system according to claim 10 wherein the unmanned aerial vehicle is configured to perform an autonomous search by the unmanned aerial vehicles-base stations according to the trajectory path policy to maximize the total energy efficiency.

* * * * *